United States Patent
Tariq et al.

(10) Patent No.: US 11,592,818 B2
(45) Date of Patent: Feb. 28, 2023

(54) RESTRICTED MULTI-SCALE INFERENCE FOR MACHINE LEARNING

(71) Applicant: Zoox, Inc., Foster City, CA (US)

(72) Inventors: Sarah Tariq, Palo Alto, CA (US); James William Vaisey Philbin, Palo Alto, CA (US); Kratarth Goel, Albany, CA (US)

(73) Assignee: Zoox, Inc., Foster City, CA (US)

( * ) Notice: Subject to any disclaimer, the term of this patent is extended or adjusted under 35 U.S.C. 154(b) by 461 days.

(21) Appl. No.: 16/013,748

(22) Filed: Jun. 20, 2018

(65) Prior Publication Data
US 2019/0391578 A1 Dec. 26, 2019

(51) Int. Cl.
| | | |
|---|---|---|
| G05D 1/00 | (2006.01) | |
| G05D 1/02 | (2020.01) | |
| G06N 7/00 | (2023.01) | |
| G06T 3/40 | (2006.01) | |
| G06N 3/08 | (2023.01) | |
| G06K 9/62 | (2022.01) | |
| G06V 10/25 | (2022.01) | |

(52) U.S. Cl.
CPC ......... *G05D 1/0088* (2013.01); *G05D 1/0231* (2013.01); *G06K 9/6256* (2013.01); *G06N 3/08* (2013.01); *G06N 7/005* (2013.01); *G06T 3/40* (2013.01); *G06V 10/25* (2022.01)

(58) Field of Classification Search
None
See application file for complete search history.

(56) References Cited

U.S. PATENT DOCUMENTS

| | | |
|---|---|---|
| 9,373,057 B1 | 6/2016 | Erhan et al. |
| 9,996,890 B1 | 6/2018 | Cinnamon et al. |
| 10,019,654 B1 | 7/2018 | Pisoni |
| 10,157,331 B1 | 12/2018 | Tang et al. |
| 10,521,699 B2 * | 12/2019 | Bremer ............... G06K 9/6259 |
| 2015/0269441 A1 | 9/2015 | Mj |
| 2016/0379371 A1 | 12/2016 | Chen et al. |
| 2017/0039457 A1 | 2/2017 | Yu et al. |
| 2018/0158189 A1 * | 6/2018 | Yedla ................... G06K 9/4628 |
| 2018/0189613 A1 | 7/2018 | Wolf et al. |

(Continued)

OTHER PUBLICATIONS

A Multi-scale Multiple Instance Video Description Network, by Xu et al., arXiv:150.05914v3 [cs.CV] Mar. 19, 2016 (Year: 2016).*

(Continued)

*Primary Examiner* — Vikkram Bali
(74) *Attorney, Agent, or Firm* — Lee & Hayes, P.C.

(57) ABSTRACT

Techniques for utilizing multiple scales of images as input to machine learning (ML) models are discussed herein. Operations can include providing an image associated with a first scale to a first ML model. An output of the first ML model can include a first bounding box indicative of a first region of the image representing a first object, with the first bounding box falling within a first range of sizes. Next, a scaled image can be generated by scaling the image. The scaled image can be provided to a second ML model, which can output a second bounding box indicative of a second region of the image representing a second object, the second bounding falling within a second range of sizes. Thus, inputting a scaled image to a same ML model (or to different ML models) can result in different detected features in the images.

19 Claims, 14 Drawing Sheets

(56) References Cited

U.S. PATENT DOCUMENTS

| | | |
|---|---|---|
| 2018/0268292 A1 | 9/2018 | Choi et al. |
| 2019/0019318 A1 | 1/2019 | Cinnamon et al. |
| 2019/0114804 A1 | 4/2019 | Sundaresan et al. |
| 2019/0130188 A1 | 5/2019 | Zhou et al. |
| 2019/0187718 A1 | 6/2019 | Zou |
| 2019/0188729 A1 | 6/2019 | Mao et al. |
| 2019/0385021 A1 | 12/2019 | Sasaki et al. |
| 2019/0392242 A1 | 12/2019 | Tariq et al. |
| 2019/0392268 A1 | 12/2019 | Tariq et al. |

OTHER PUBLICATIONS

Coarse-to-Fine Trained Multi-Scale Convolutional Neural Networks for Image Classification, by Dou et al., Key lab of machine perception (MOE), Speech and hearing research center, Peking University, Beijing, 978-1-4799-1959-8/15 IEEE (Year: 2015).*

ProNet: Learning to Propose Object-specific Boxes for Cascaded Neural Networks, by Sun et al., arXiv: 1511.03776v3 [cs.CV] Apr. 13, 2016, pp. 3485-3493 (Year: 2016).*

Non Final Office Action dated Dec. 26, 2019 for U.S. Appl. No. 16/013,764 "Instance Segmentation Inferred From Machine-Learning Model Output" Tariq, 12 pages.

Girshick, "Fast R-CNN", retrieved on Jun. 21, 2018 at <<https:jjarxiv.orgjpdf/1504.08083.pdf>> ARXIV: Computer Science—Computer Vision and Pattern Recognition, Apr. 30, 2015, pp. 1-9.

Hosang et al., "A Convnet for Non-maximum Suppression", International Conference on Computer Analysis of Images and Patterns, CAIP 2017: Computer Analysis of Images and Patterns, Aug. 2017, pp. 192-204.

The PCT Search Report and Written Opinion dated Sep. 25, 2019 for PCT Application No. PCT/US2019/037967, 11 pages.

Hosang, et al., "Learning Nonmaximum Suppression" ICCV, arXiv: 1705.02950v2, May 9, 2017, 16 pages.

Liang, et al.," I he Design of Objects Bounding Boxes Non-Maximum Suppression and Visualization Module Based on FPGA", 2018 IEEE 23rd International Conference on Digital Signal Processing (DSP), Shanghai, China, 2018, pp. 1-5.

Non Final Office Action dated Jul. 8, 2020 for U.S. Appl. No. 16/013,729, "Machine Learning Techniques", Tariq, 10 pages.

Wang, et al., "Daedalus: Breaking Non-Maximum Suppression in Object Detection via Adversarial Examples" arXiv preprint arXiv: 1902.02067, Jun. 1, 2020, 15 pages.

* cited by examiner

RESTRICTED MULTI-SCALE INFERENCE FOR MACHINE LEARNING

BACKGROUND

Computer vision is mission critical to some applications, such as operating autonomous vehicles. Equipping a computer with functionality that imitates human vision may include building software components that take an image, identify salient portions from the image, and represent the salient portions of the image to the computer in a form that the computer can use to conduct further operations. One form of software that can be built to equip a computer with such functionality are machine-learned (ML) models.

Previous attempts to train ML models to identify salient portions of an image have resulted in flawed ML models. For example, some forms of ML model training result in a ML model that cannot properly distinguish between objects that are proximate to each other (e.g., a pedestrian that passes in front of another pedestrian in the camera's view), resulting in extraneous and/or inaccurate identifications of one or both objects.

Moreover, some ML models provide more accurate object identifications than such flawed ML models, but require too much computation to be useful for a real-time application and/or may require expensive and specialized computing equipment that may not suit a particular use. For example, an autonomous vehicle using an ML model for computer vision may receive a video stream and may be required to make decisions to operate the autonomous vehicle every 50 milliseconds or less. Because of the compute time required for some of these ML models to identify an object, the object detected may have moved significantly enough by the time the object is detected, and accordingly, the object detection is no longer reliable for decision-making. For example, some of these ML models may require a compute time over 100 milliseconds.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
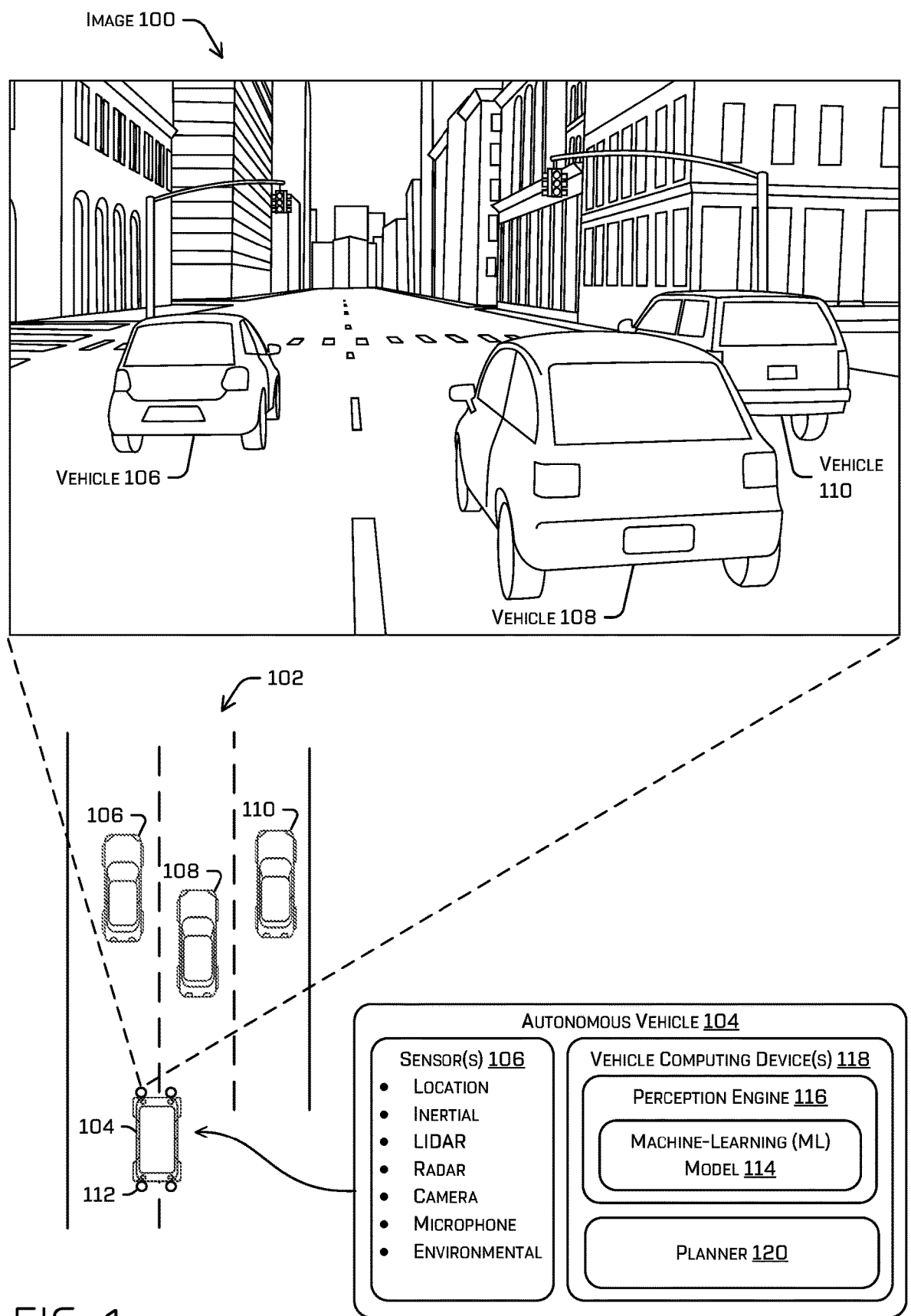
FIG. 1 illustrates an example image for an example scenario, including an example aerial view of the scenario.

The techniques discussed herein improve computer vision by increasing the accuracy of object detection and decreasing the compute time for obtaining accurate object identifications so that objects may be detected in real time for use in applications such as autonomous vehicle control. Other applications of the techniques discussed herein are contemplated such as, for example, video games, augmented reality, etc.

The techniques discussed herein may include providing an image to an ML model and receiving, from the ML model, multiple regions of interest (ROIs) for different portions of an image. These ROIs may be any form of identifying what the ML model believes to be the existence of an object in the image. For example, an ROI may include a box indicative of pixels identified as being associated with the detected object (a "bounding box"), a mask that includes pixels that correspond to the detected object, etc.

In some instances, the ML model may additionally, or alternatively, output confidence scores (or confidence information) associated with each of the multiple ROIs. For example, the ML model may detect the presence of an object from a portion of the image, and may generate an ROI to indicate where that object is in the image. The ML model may additionally, or alternatively, produce a confidence score that essentially indicates how confident the ML model is that the ML model actually identified a salient object in the image and/or how well the ROI fits the object. For example, a confidence score may be a value between 0 and 1, where 0 represents an indication by the ML model that the ML model is not at all confident that an object appears in the ROI and where 1 indicates that the ML model is strongly confident that an object appears in the ROI, although other permutations are contemplated. In other words, the ML model outputs an indication of where it thinks an object might be and a score that indicates how confident the ML model is that it correctly identified an object and/or how well the ROI points out where the object is in the image.

Some of the techniques discussed herein are directed to training the ML model to produce better ROIs (ROIs identifying where the object is in the image more accurately) and/or more accurate confidence scores (e.g., producing a score closer to 0 for an ROI that does not contain an object and/or a score closer to 1 for an ROI that does indicate a salient object) and to reduce the compute time to achieve ROIs of such an accuracy.

The ML model may include a neural network, such as a random forest and/or boosted ensemble of decision trees; a directed acyclic graph (DAG) (e.g., where the nodes are organized as a Bayesian network); deep learning algorithm(s), such as artificial neural networks (ANN) (e.g., recurrent neural network (RNN), residual neural network (ResNet)), deep belief network (DBN), deep stacking network (DSN); etc. Loss functions for training the ML model may include, for example, determining a degree of alignment of the ROI to an area of the image indicated by a ground truth as representing an object. In some instances, determining the degree of alignment of the ROI to the area indicated by the ground truth may include determining an intersection over union (IoU) for the ROI, which is one metric for determining how well the ROI "fits" the ground truth. Other indications of a fit of the ROI to the area indicated by the ground truth may be used. In some instances, the ground truth can be referred to as a reference region.

Because training ML models may include providing tens of thousands, and even hundreds of thousands of images or more to the ML model and making such corrections to the weights, it is advantageous to identify those ROIs which the ML model got most wrong. This vastly decreases the time spent training an ML model and may increase the accuracy of the ML model since corrections made to the ML model to account for "very wrong" ROIs and/or confidence scores aren't washed out by reinforcing learning of "correct" ROIs and/or confidence scores.

In some instances, the techniques discussed herein may include selecting particular examples for training the ML model. Selecting these examples may include hard example mining, for example, which may include sorting multiple ROIs by confidence scores (e.g., greatest confidence scores to least) and/or error in confidence score (e.g., a confidence score error associated with an ROI, for an ROI that was suppressed according to NMS) and choosing the top n number of ROIs. In some instances, selecting examples by hard example mining may exclude the ROI associated with a maximum confidence score (or scores). Additionally, or alternatively, the techniques may include choosing n number of random ROIs. In some instances, the number, n, may be chosen to be the number of positive examples in the image (e.g., positively identified ROIs corresponding to objects represented in the image).

However, in some training schemes (such as training on a portion, e.g., 30% of an area representing an object as opposed to the whole area, as will be described in more detail herein), merely selecting a top n number of ROIs (by confidence score) may skew the ML model training because frequently, at least some of the top n number of ROIs tend to correctly identify an object. Since those examples adequately predict the expected ROI, such selected examples should not be penalized. As will be discussed in detail below, techniques may include suppressing some of the top n ROIs from being chosen to train the ML model and selecting new ROIs to replace the suppressed ROIs. Additionally, or alternatively, an example chosen as a hard negative example, but that agreed with a region of interest, may instead be reassigned as a positive example. In other words, networks (such as those described herein) may disambiguate between actual hard examples and examples which should not be penalized for training. Regardless, in at least some examples, such chosen example may include backpropagation (either to penalize as an actual hard negative example, or to improve as a good example).

In some instances, such techniques may exclude portions of image data for training based at least in part on determining (1) that a degree of alignment of an ROI associated with the portions to a ground truth for the object indicated by the ROI meets or exceeds a threshold degree of alignment (e.g., the ROI fits the area indicated by the ground truth "well"), and (2) that the ROI was generated for a portion of the image that is within the area indicated by the ground truth. On the other hand, an ROI produced from a portion of the image that lies outside the ground truth, no matter how well the ROI fits the ground truth, may be included in the subset for training (the "training subset") and penalized in the loss function. Similarly, an ROI produced for a portion of the image that lies within the ground truth, but produces a "bad" ROI (e.g., the degree of alignment of the ROI to the ground truth is less than a threshold degree of alignment) may be included in the training subset and penalized in the loss function. In some instances, the top n examples may be selected for inclusion in the training subset, excluding those examples discussed above in accordance with the technique. This technique that uses the exclusion/inclusion rules discussed herein is referred to herein as an improved hard example mining technique.

The training subset (determined by the exclusion/inclusion rules) may be provided to a loss function. Such a loss function may comprise, for example, a cross-entropy loss function, a Huber loss function (e.g., for the confidence score in examples where the confidence score is included in the training/loss determination with the ROI associated therewith), mean-squared error, focal loss function, etc.

In some instances, the techniques may include training the ML model using multiple stages. The stages may include providing a first batch of images (whether scaled or not) to the ML model and training the ML model using hard examples according the procedure above from the first batch of images. In some instances, the first batch may include tens of thousands or hundreds of thousands of images.

In some instances, training the ML model may include may include a second stage that follows the first stage. Training the ML model during the second stage may comprise using the training subsets which includes hard examples. In some instances, the second stage may additionally include training the ML model using a focal loss function. In some instances, the focal loss function may modify the loss computed by a cross entropy loss function (or any other loss function) so that the loss (errors) calculated for well-classified ROIs are downweighted and the loss calculated for poorly-classified ROIs is less weighted.

In some instances, the receptive field of the ML model may cause the ML model to produce ROIs for objects that are too large for the receptive field that are associated with a poor confidence score and/or error value. For example, if a human were to stand with their nose touching against a painting, it would be very difficult to identify the painting, let alone to identify particular objects in the painting. This is because the salient portions of the painting are outside the human's receptive field.

Similarly, an ML model may poorly detect objects that are outside the receptive field of the ML model (e.g., objects that are too large for enough of the object to fall into the receptive field for the ML model to "see" the object and comprehend what the ML model "sees").

Some techniques for remedying this problem have included providing, as input to an ML model, an image, using the ML model to obtain objects within a size range, followed by down-scaling the image and re-running it through the ML model so that objects that were formerly outside the size range now fall within the size range (after being scaled). This may be repeated iteratively. Note that scaling the image down makes large objects appear to be smaller in the scaled-down image, allowing them to fall within the receptive field of the ML model. While it may be possible to train an ML model with a receptive field that is substantially similar to the size of the input image, such an ML model may be slow or not responsive enough, for example, for use in autonomous driving.

In an additional or alternate instance, the techniques described herein may include determining a response curve associated with a first ML model that indicates the accuracy of the first ML model to classify (e.g., produce an ROI and/or confidence score for) an object over an apparent object size in an image. In some instances, producing this response curve may include providing multiple objects in image(s) to the first ML model and tracking how well the first ML classifies objects of different sizes. The techniques may include determining an accuracy of an ROI and associating the accuracy and a size of the ROI (e.g., a height, a width, an area). In at least some instances, output sizes of the ML model may be constrained based on an optimal region based on the input scale size. As a non-limiting example, an ML model which takes a 640×480 image as input may be constrained to output ROIs having pixel sizes on the order of 100×100 to 200×200, while an ML model which takes a 940×940 image as input may be constrained to output ROIs having pixel dimensions on the order of 250×250 to 300×300 pixels.

These accuracy/ROI size pairs may be amalgamated for each ROI determined for the first ML model. The techniques may include identifying a range of ROIs associated with accuracies that meet or exceed a threshold accuracy. This range of sizes may indicate that the first ML model determines "good" ROIs for objects in that range of sizes. In some instances, the first ML model may output ROIs that have sizes within the size range and may suppress other ROIs determined by the ML model.

In some instances, the first batch of images may be scaled down, using a scale factor (e.g., 0.75, 0.5), and the batch of scaled images may be provided, as input, to a second ML model. A second response curve and a second range of sizes may similarly be determined for the second ML model, based at least in part on the batch of scaled images.

In some instances, at run time, an image may be provided, as input, to the first ML model; the image may be scaled and provided, as input, to the second ML model; and the ROIs output by the first ML model may be restricted to ROIs within the first range and the output of the second ML model may be restricted to ROIs within the second range. The ML models may be trained such that the different ranges of ROIs associated with the different ML models overlap and/or abut each other so that a larger range of object sizes may be detected by multiple ML models.

Put simply, the techniques may include training at least two ML models and determining a range of ROI sizes for which each ML model produces "good" ROIs. That way, instead of repetitively providing an image to an ML model, receiving outputs, scaling the image, re-providing it to the ML model, receiving second outputs, and so on, the process may be shortened and accuracy increased by providing scaled versions of the same image to multiple ML models (e.g., providing a first scaled image to a first ML model, a second scaled image to a second ML model, and so on, where the scaled images are scaled versions of a same unscaled image), where each ML model is trained to respond best to a small range of sizes and is constrained to output ROIs within that small range. In general, such a technique may improve the speed and performance of detecting objects in images, while reducing memory requirements (e.g., reduced GPU memory requirements).

The techniques described herein may also include techniques for providing, as input to an ML model, an image and receiving, as output from the ML model, both an ROI and an object segmentation (e.g., mask, contour set) identifying specific pixels (or other portions of the image) associated with an object detected in the image. Instead of requiring a second ML model and/or a second operation to segment the image (e.g., identify which pixels correspond with the detected object, e.g., by outputting a mask or set of lines and/or curves), the techniques discussed herein substantially simultaneously (e.g., within technical tolerances) detect an object (e.g., determine an ROI) and segment the image.

In some instances, the techniques for instance segmentation (e.g., segmenting an image on a pixel by pixel basis) may include receiving, at a ML model, an image; and determining an ROI for a portion of the image (e.g., a pixel, a cluster of pixels) and a confidence score associated therewith, until the ML model has determined a plurality of ROIs and a plurality of confidence scores associated therewith for a plurality of portions of the image. In some instances, the ML model may detect an image by selecting, for output, an ROI associated with a maximum confidence score ("output ROI"). To segment the region of the image that represents the object that the output ROI identifies, the techniques may include determining that a subset of the plurality of ROIs associated with confidence scores meet or exceed a confidence score threshold, substantially overlap with the ROI associated with the maximum confidence score, and/or are within a threshold confidence of the maximum confidence score; and concatenating the portions from which the ROIs were determined to an image segmentation (e.g., by adding a pixel to a mask, by modifying a curve to include the pixel).

Explained differently, to decide whether to include data (e.g., a pixel) of the image in an instance segmentation (which may be a mask), the techniques may include determining whether an ROI associated with that particular pixel (or portion of a feature map) is substantially similar to a representative ROI and its corresponding confidence value. In at least one example, the instance may comprise all pixels corresponding to a single ROI which would be suppressed under non-maximum suppression (also referred to as non-maximal suppression).

In some instances, training an ML model to produce an instance segmentation for an object may include training based on a ground truth mask and an associated ROI of the object. In such an example, the loss function may be configured to penalize portions of the image outside of the mask for producing an ROI with a confidence score over a predefined value. In other words, pixels (or regions) of an image such an ML model should not output an ROI if such pixels would fall outside of the mask of an object associated with the pixel (or region), even if the ROI is adequate. Although this specification predominantly discusses the instance segmentation as resulting in outputting a pixel mask, it is contemplated that any suitable method for identifying a subset of the image may be used (e.g., outputting a set of points, lines, curves, and/or other edge indicators).

Example Scenario

FIG. 1A illustrates an example image 100 and an example aerial view of an example scenario 102 from which the example image 100 may have been generated. The example scenario 102 may include an autonomous vehicle 104, and three other vehicles 106, 108, and 110 that are operating in a same environment as the autonomous vehicle 104 (e.g., the city block depicted in the example image 100, which may include the driving surface depicted in the aerial view of the example scenario 102). The autonomous vehicle 104 may receive sensor data from one or more sensors of the autonomous vehicle 104. The autonomous vehicle 104 may use this sensor data to determine a trajectory for controlling motion of the autonomous vehicle. The sensor data may include an image such as, for example, example image 100.

In some instances, the autonomous vehicle 104 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 104 may be a fully or partially autonomous vehicle having any other level or classification now in existence or developed in the future. Moreover, In some instances, the computer vision techniques described may be usable by non-autonomous vehicles as well.

According to the techniques discussed herein, the autonomous vehicle 104 may receive an image from a sensor 112 of the autonomous vehicle 104 and may detect object(s) from the image such as, for example, the other vehicles 106, 108, and 110, and/or may segment detected objects in the image. For example, the autonomous vehicle 104 may identify and segment the other vehicles 106, 108, 110; a drivable surface; the traffic lights; etc. In some instances, this detecting and/or segmenting may be accomplished by providing the image as input to an ML model 114 of a perception engine 116 running on computing device(s) 118 of the autonomous vehicle 104.

In some instances, the perception engine 116 may include one or more ML models and/or other computer-executable instructions for detecting, identifying, segmenting, classifying, and/or tracking objects from sensor data collected from the environment of the autonomous vehicle 104, such as ML model 114. In some instances, the autonomous vehicle 104 the perception engine 116 may receive sensor data from one or more sensors 112 of the autonomous vehicle 104, determine perception data from the sensor data, and transmit the perception data to a planner 120 for use by the planner 120 to localize a position of the autonomous vehicle 104 on a global map, determine one or more trajectories, and/or control motion of the autonomous vehicle 104 to traverse a path or route, though any such operation may be performed in various other components (e.g., localization may be performed by a localization engine, not shown).

For example, the perception engine 116 may detect an object in the environment and classify the object (e.g., passenger vehicle, semi-truck, pickup truck, human, child, dog, ball). The perception engine 116 may also determine a track of the object (e.g., historical, current, and/or predicted heading, position, velocity, and/or acceleration of the object). In some instances, the perception engine 116 may additionally or alternatively determine a position of the autonomous vehicle 104 determined by a localization engine (not pictured, which may use any sensor data to localize the vehicle 104), data related to objects in the vicinity of the autonomous vehicle 104, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception engine 116 may be collectively referred to as "perception data." Once the perception engine 116 has identified and/or segmented objects from the image and/or determined other perception data, the perception may provide the perception data, including the object detections and/or segmentations, to a planner 120.

In some instances, the planner 120 may use perception data, including the identified and/or segmented objects, to generate a trajectory for controlling motion of the autonomous vehicle 104. For example, the planner 120 may determine a route for the autonomous vehicle 104 from a first location to a second location, generate, substantially simultaneously, a plurality of potential trajectories for controlling motion of the autonomous vehicle 104 in accordance with a receding horizon technique (e.g., 1 micro-second, half a second) to control the vehicle to traverse the route, and select one of the potential trajectories as a trajectory of the autonomous vehicle 104 that may be used to generate a drive control signal that may be transmitted to drive components of the autonomous vehicle 104.

Example Region of Interest (ROI) Generation by ML Model

Figure 2A:
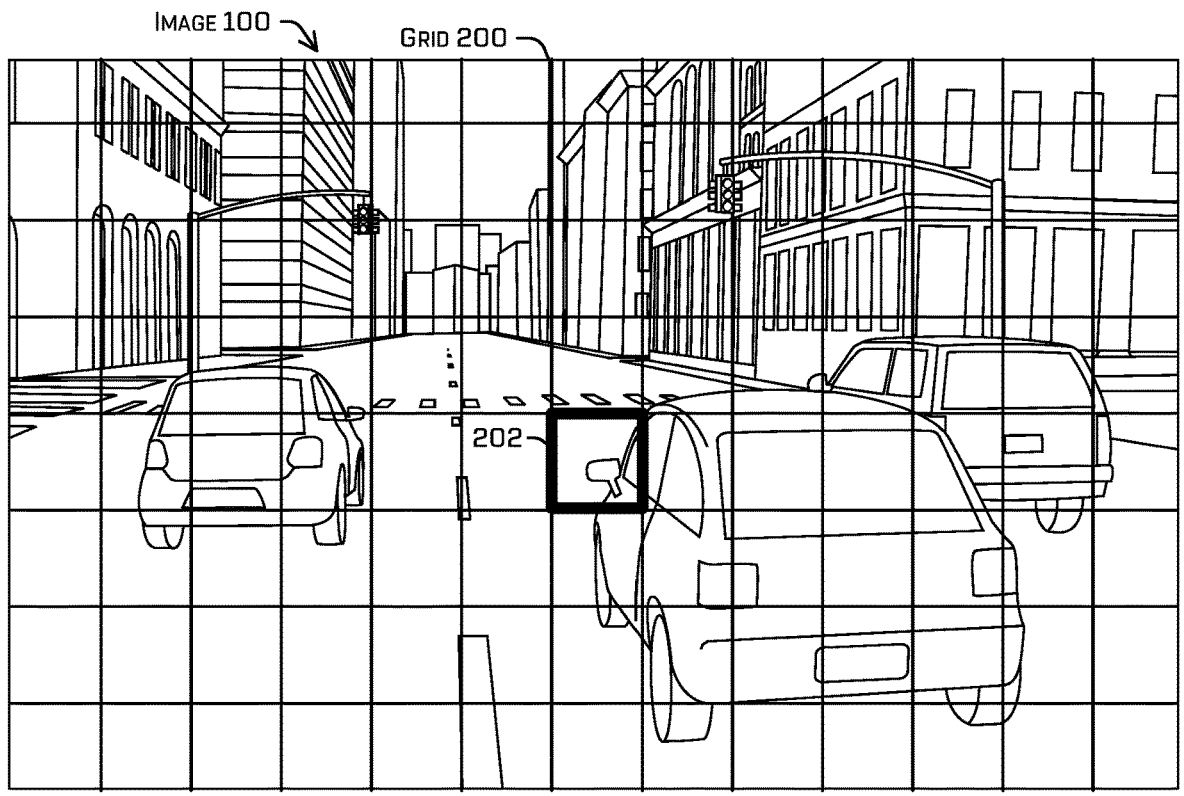
FIG. 2A illustrates an example image and how such an image may be discretized as a grid.

FIG. 2A illustrates example image 100 and an example output grid 200, where each cell of the output grid 200 identifies a portion of the image 100. One example portion of the image 202 is emphasized (bolded) near the center of the image 100. It is contemplated that, as discussed herein, a "portion of the image" may include a single pixel of the image and/or a collection of pixels of the image. In some instances, an output of the machine learning model is a feature map, wherein an individual cell may represent a portion of a feature map. Such a feature map may have multiple channels, each channel associated with various element(s) determined by the model (e.g., a confidence score, a region of interest, etc.). FIG. 2A illustrates an example where a "portion of the image," e.g., example portion 202, includes a collection of pixels of the image 100. A portion of the feature map (e.g., a cell) may be associated with a portion of the image. Example portion 202 may, therefore, be called an example cell 202 of the example output grid 200.

In some instances, the example output grid 200 may be a manner of discretizing the example image 100 as output by the ML model. For example, the ML model may be configured to receive the image and output one or more ROIs and associated confidence levels per cell of the output grid 200. In at least some instances, such an output grid 200 may be discretized into m/4 by n/4 cells, according to an image of m by n pixels. In some instances, the cells may be 4 pixels by 4 pixels, though any other discretization is contemplated. In some instances, and as mentioned above, the example image 100 can be discretized into a plurality of portions of a feature map. That is, the examples are not limited to a grid of cells, and various implementations are contemplated herein.

In some instances, an ML model may generate an ROI and/or a confidence score for each portion of the image (e.g., for each cell in FIG. 2A). For example, the ML model may determine an ROI and/or a confidence score for example portion 202. In some instances, the ML model may generate an ROI that has boundaries of the ROI that extend beyond the boundaries of the portion of the image. In at least some instances, each output cell may correspond with a ROI indicated by a center position (e.g., a <u, v> image coordinate position), extents (e.g., a width and/or height), and/or a confidence level for any one or more classifications. As a non-limiting example, each cell may be associated with a center, extents, and confidence for each of a car, pedestrian, bicyclist, truck/bus, traffic light, and/or stop sign classification.

Figure 2B:
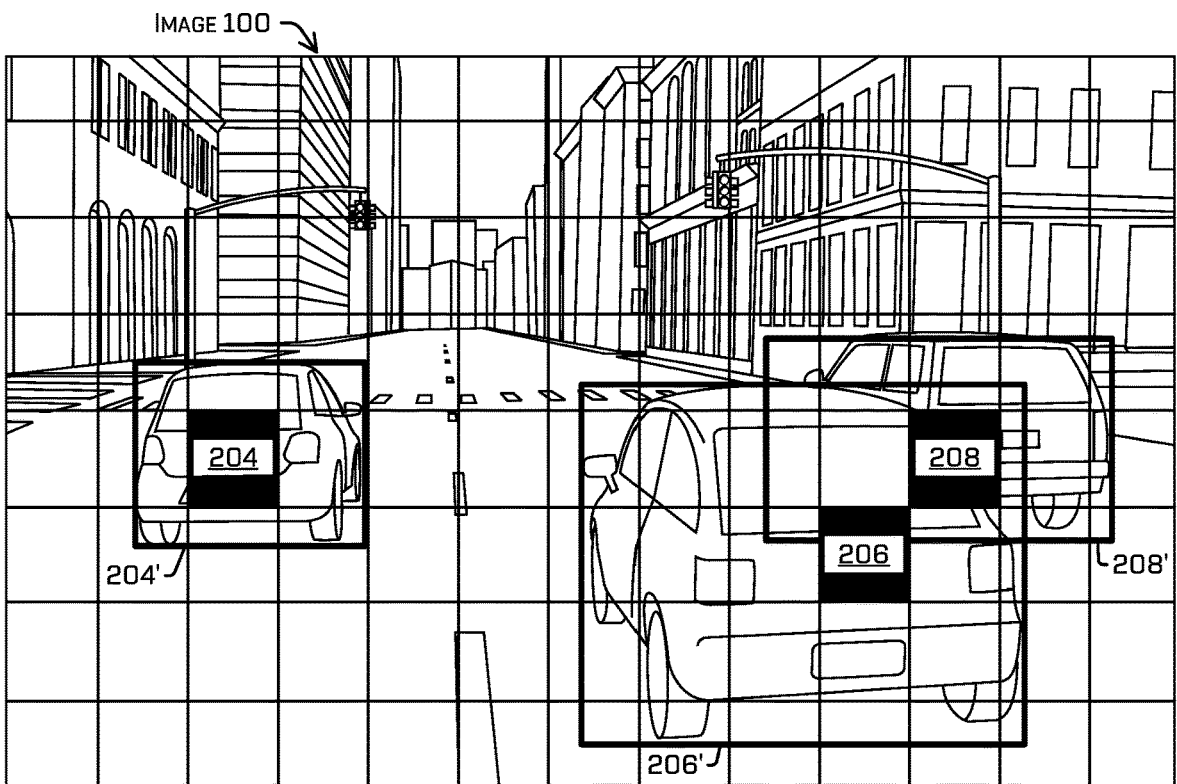
FIG. 2B illustrates example regions of interest (ROIs) and portions of the image for which the ROIs were generated.

FIG. 2B illustrates example portions of the image (i.e., cells in the image) and their associated regions of interest (ROIs) with respect to a classification of "car." FIG. 2B illustrates the ROIs as bounding boxes, although it is understood that the region of the image representing an object may be otherwise indicated (e.g., by a mask). An ML model, as discussed herein, may determine ROI 204' for portion 204 (e.g., cell 204), ROI 206' for portion 206, and ROI 208' for portion 208. In some instances, the ML model may determine a first confidence score in association with ROI 204', a second confidence score in association with ROI 206', and a third confidence score in association with ROI 208'. A confidence score may indicate a probability that the associated ROI accurately represents a region of the image that represents an object (here, a car). Each of the ROIs 204', 206', and 208' identifies different regions of the image that represent different objects, i.e., vehicles 106, 108, and 110, respectively. In some instances, ROI 204' may be considered a "detection," by the ML model, of vehicle 106 in the image 100.

Example Machine-Learning (ML) Model Training Technique

Figure 3:
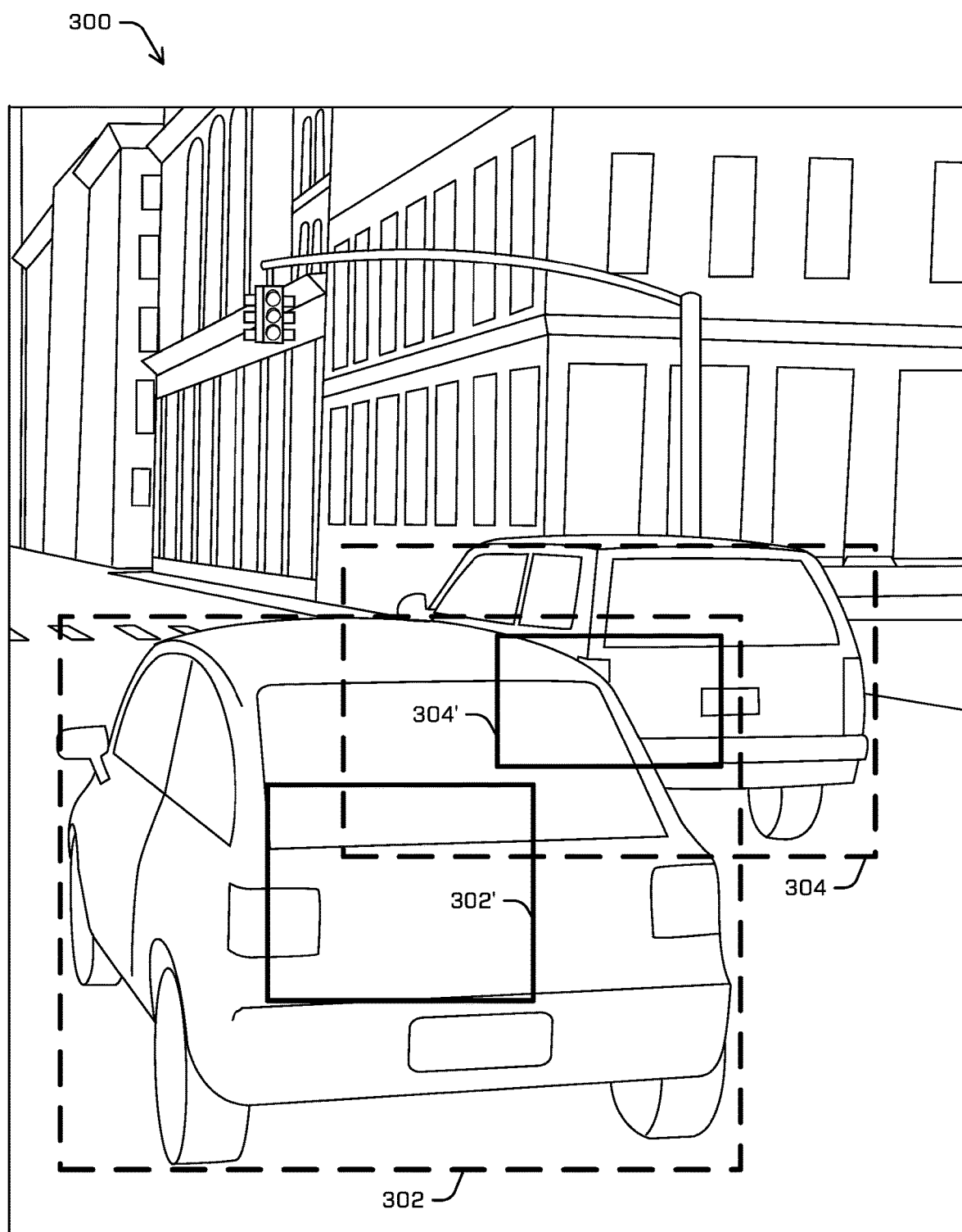
FIG. 3 illustrates example ground truths indicating two areas and example shrunken ground truths indicating second, smaller areas.

FIG. 3 illustrates a portion 300 of example image 100, an example ground truth 302 that identifies a first area of the image that represents a first object (i.e., vehicle 108), example ground truth 304 that identifies a second area of the image that represents a second object (i.e., vehicle 110, and two scaled ground truths 302' and 304'. Example scaled ground truth 302' is an area that defines a central 30% of ground truth 302 ("central 30% box 302"), and example scaled ground truth 304' is an area that defines a central 30% of ground truth 304. Of course, while the example scaled ground truth 302' is described as corresponding to a central 30% of ground truth 302, any percentage is contemplated herein.

The following discussion concerns techniques for training the ML model and how to train the ML model so that the ML model will generate ROIs and/or confidence scores that are more accurate. In some instances, FIGS. 3-6 generally illustrate techniques for determining how to penalize various outputs of the ML model while training.

As illustrated in FIG. 3, the ML model may be trained only using those scaled 30% regions as this enables disambiguating between objects that appear as overlapping in the image 100 (i.e., occlusions), such as vehicles 110 and 112. Note that the ground truth 302 partially occludes ground truth 304 overlap, so training the ML model according to the technique discussed above may avoid ambiguities when deciding to which object should a portion of the image be associated (i.e., which ROI to output).

FIGS. 4A-4D illustrate example ROIs, example confidence scores associated with the ROIs, and portions of the image for which the ROIs were generated.

Figure 4A:
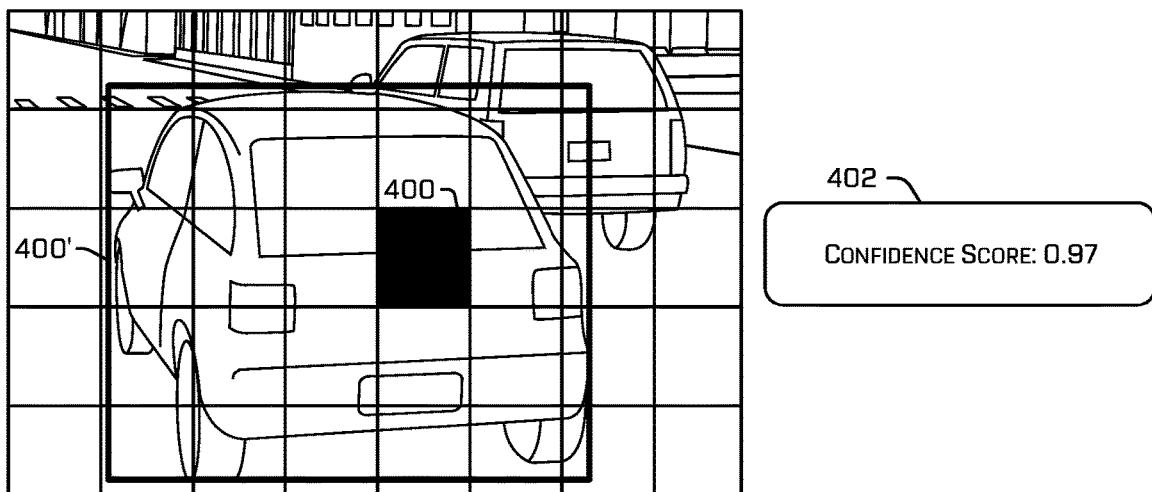
FIGS. 4A-4D illustrate example ROIs, example confidence scores associated with the ROIs, and portions of the image for which the ROIs were generated.

FIG. 4A illustrates an example ROI 400' that the ML model may have determined for portion 400 and a confidence score 402 that the ML model may have determined for the ROI 400' for a specific classification such as "car," for example. In some instances, the confidence score indicates a probability, determined by the ML model, that the ROI with which the confidence score is associated accurately identifies an object in the image. For example, the confidence score may indicate a probability that the ROI fits an area comprising pixels representing the object perfectly (e.g., no pixel identified by the ROI represents something other than the detected object, the edges of the ROI encompass edges of the object without intersecting a boundary of the object and leave a minimum amount of space between a boundary of the object and the ROI).

In the example depicted in FIG. 4A, the confidence score 402 is "0.97." In some instances, the ML model may determine confidence scores between 0.00 and 1.00, although other values are contemplated. In that example, a 0.00 may indicate that the ML model does not think the ROI generated for a portion of the image identifies an object and/or a 1.00 may indicate that the ML model is absolutely sure that the ROI identifies an object, with a perfect degree of alignment.

Figure 4B:
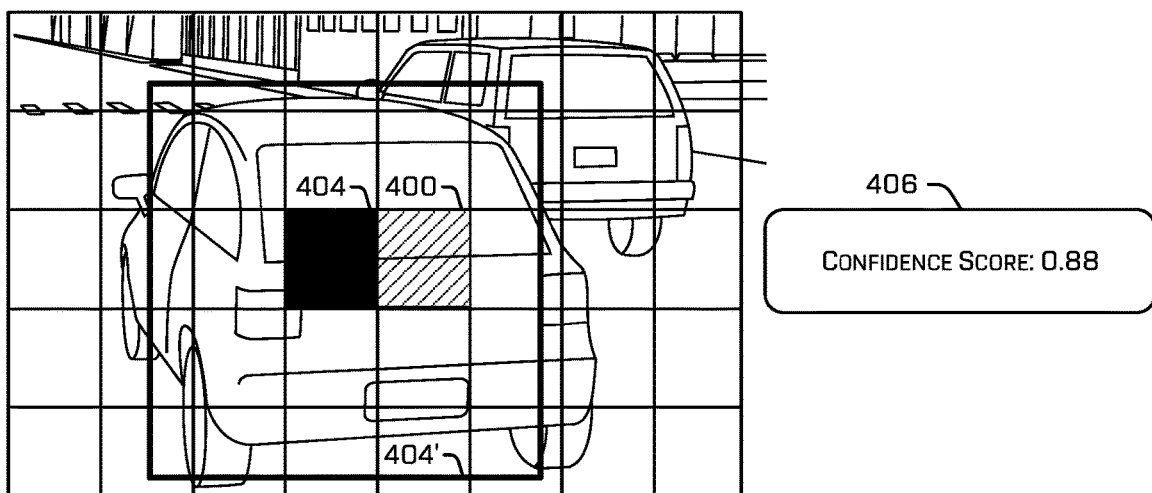

FIG. 4B illustrates an example ROI 404' that the ML model may have determined for portion 404 and a confidence score 406 that the ML model may have determined for the ROI 404'. Note that the ROI 404' does not fit the region representing the object (i.e., vehicle 110) as well as ROI 400', as it is slightly too small. The confidence score 406, in this example, is correctly lower than the maximum confidence score, confidence score 402, at least because the ROI 404' does not fit the region representing the object (i.e., vehicle 108) perfectly, or as well as ROI 400'. Also note that portion 400 continues to be shown as a reference point for FIGS. 4B-4D, not to imply that the ROIs of those figures are somehow associated with the portion 400.

Figure 4C:
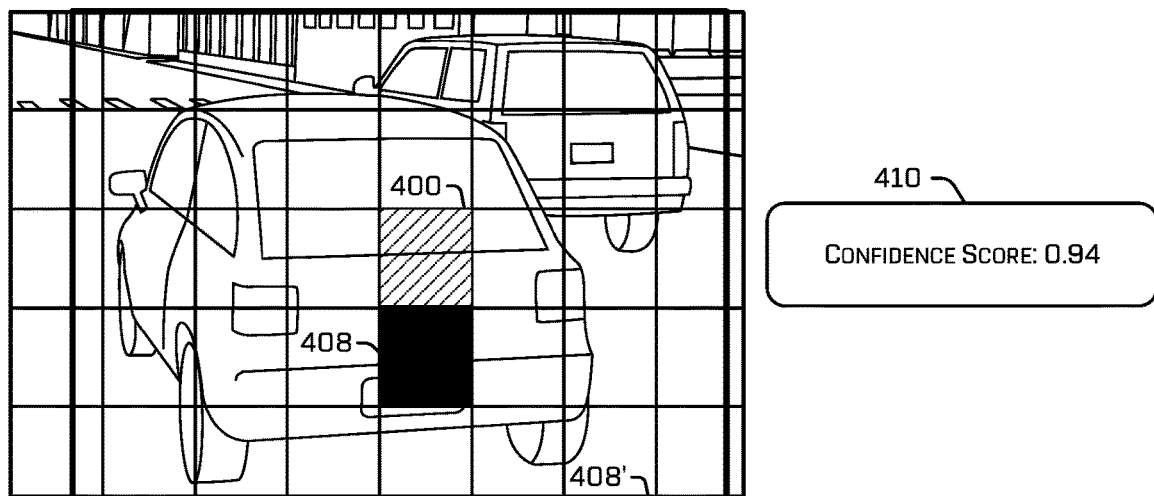

FIG. 4C illustrates an example ROI 408' that the ML model may have determined for portion 408 and a confidence score 410 that the ML model may have determined for the ROI 408'. Note that the ROI 408' does not fit the region representing the vehicle 108 well, as it is too big and encompasses more objects than just the vehicle 108. Unlike confidence score 406 that was appropriately lower due to the mediocre fit, confidence score 410 reflects a value of 0.94, which may be considered too high for the poor fit of the ROI 408' to the region of the image representing vehicle 108.

Figure 4D:
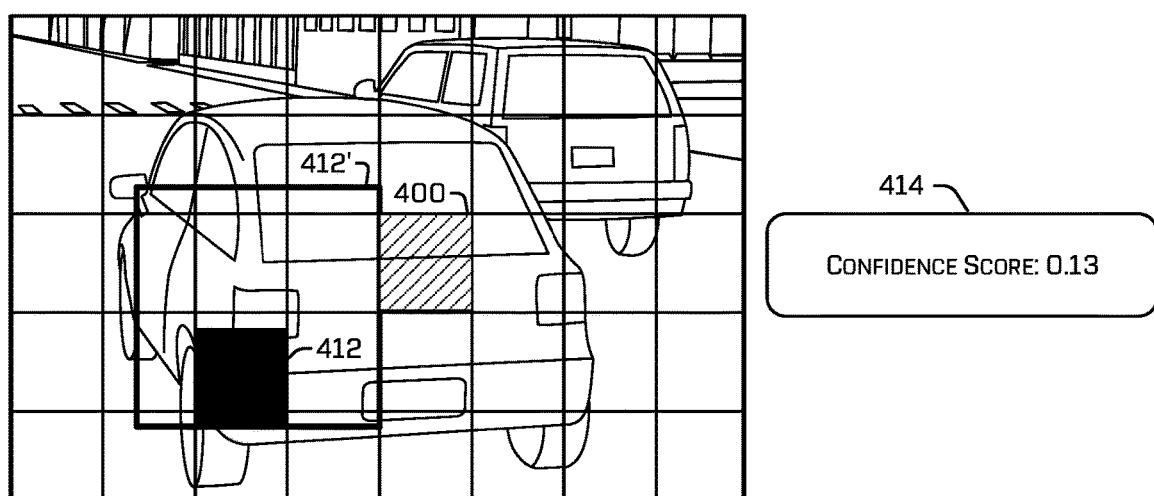

FIG. 4D illustrates an example ROI 412' that the ML model may have determined for portion 412 and a confidence score 414 that the ML model may have determined for the ROI 412'. Note that the ROI 412' does not fit the region representing the object (e.g., the vehicle 108) well, as it is much too small. Confidence score 414 reflects a value of 0.13, which is appropriate considering the poor fit of the ROI 412' to the region of the image representing vehicle 108.

Figure 5:
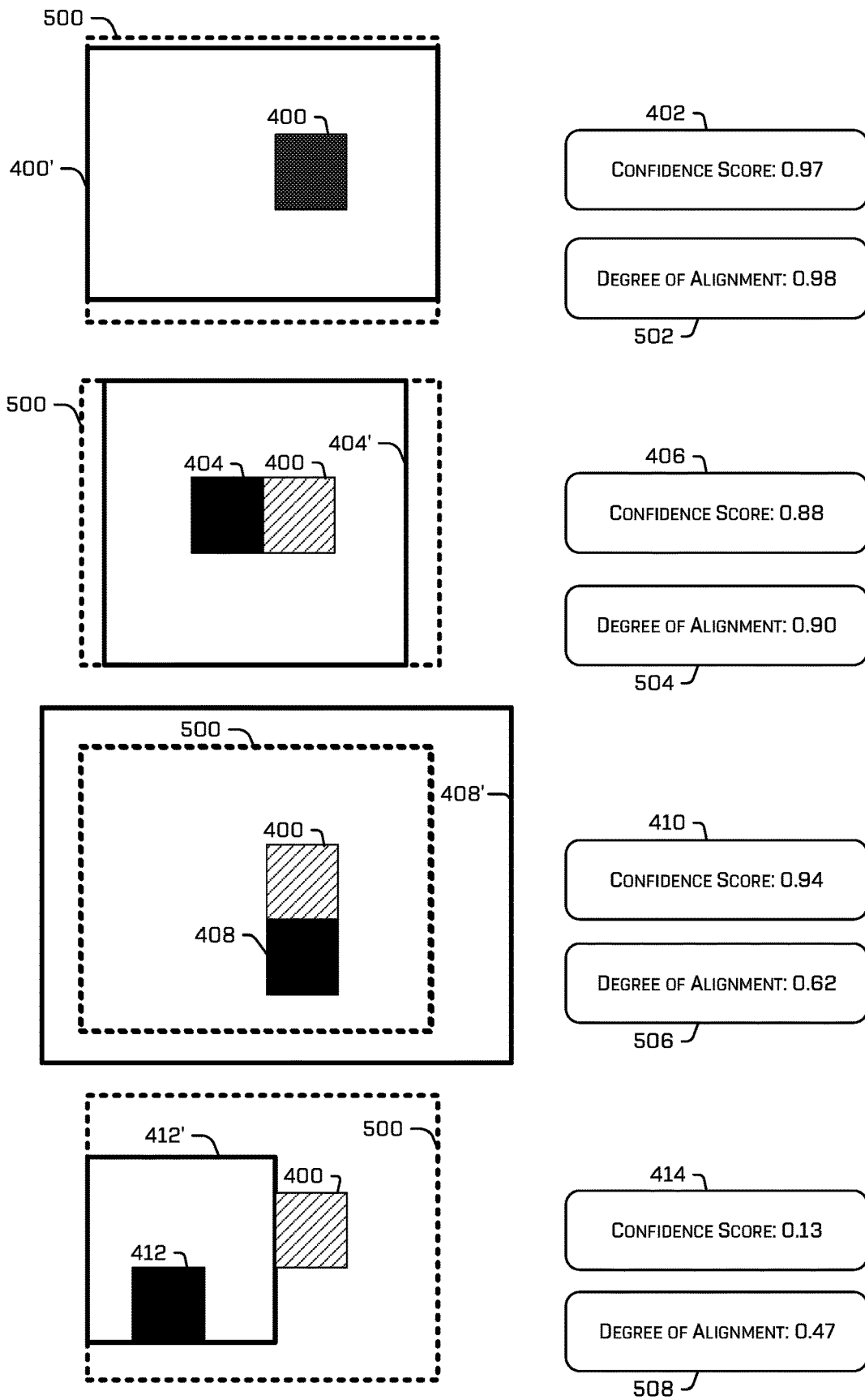
FIG. 5 illustrates the example ROIs of FIGS. 4A-4D, relative to an area indicated by a ground truth, and associated with a degree of alignment of the example ROIs to the area indicated by the ground truth.

FIG. 5 illustrates an example of selecting regions for non-maximum suppression (NMS) reassignment. In general, because of the sparsity of positive examples in an image, the ML model may be trained using a balance of positive examples and negative examples to output better estimations. Training may also incorporate "hard" examples (i.e., examples which provide a high confidence of being correct, but that are not correct). In some instances, an equal number of positive, negative, and hard examples are provided to the network for training. In at least some instances, confidence levels of all cells (portions of the image) may be sorted and the highest confidences producing an incorrect ROI may be selected as hard examples. When using the technique illustrated with respect to FIG. 3, portions of the image (e.g., cells) which fall within a ROI associated with a highest confidence, but were not part of the central 30%, may generally be penalized by naïvely indicating such cells as "hard" examples (i.e., the network may be explicitly trained not to output an ROI with those cells because they have a high confidence level, but do not fall within the central 30%). Though the technique described with respect to FIG. 3 may aid in disambiguation (providing better ROIs), training models naïvely by penalizing these portions may lead to poor performance (e.g., bad estimates). Training the model intelligently, as described in detail below, may avoid such naïve assumptions.

In some instances, the ML model may determine that portions of the image (e.g., cells) which have been indicated as hard examples are associated with an ROI that is suppressed under NMS. In other words, the model may determine that a cell selected as a hard example should not be selected and another hard example should be chosen so as to backpropagate loss for penalization of a true hard example. In at least some examples, the cell selected as a hard example, but that has output a good box, may instead be reassigned as a good example (i.e., such that losses are backpropagated to improve the output corresponding to the cell). Such a process may generally be referred to as NMS reassignment. Various examples of portions of an image which should and should not be subject to NMS reassignment are illustrated in FIG. 5.

Throughout FIG. 5, an area indicated by a reference ROI (ground truth ROI and/or an ROI determined by non-maximum suppression (NMS)) represented by a dotted line (e.g., a reference 500), and degrees of alignment of the example ROIs are given with respect to the reference 500. The portions of the image from which the example ROIs were generated continue to be reproduced in FIG. 5 for context, with portion 400 reappearing in each for visual context. In some instances, to select which ROI to output, of multiple ROIs that were generated that may correspond to the object in the image, the ML model may NMS the multiple ROIs, which is to say the ML model may determine which ROI is associated with a maximum confidence score and may identify that ROI as the ROI to output in associated with the object. In some instances, where multiple objects of a certain object classification are represented in an image, the ML model may determine a cluster of ROIs that overlap (e.g., that have degrees of alignment with respect to each other that meet or exceed a threshold degree of alignment), thereby indicating a likelihood that an object is represented in the image somewhere in the image around that cluster of ROIs, and may NMS the cluster of ROIs to determine an output ROI for the object. In other words, outputting an ROI in association with a single object may be based on determining an ROI associated with a maximum confidence score, of the multiple ROIs that overlap. The ML model may repeat identifying clusters and performing NMS with respect to the clusters until all objects have been identified and subjected to NMS. This may be done for each object classification for which an ROI is detected. In some instances, identifying a cluster may include identifying ROIs associated with confidence scores that exceed a confidence score threshold in addition to identifying ROIs that overlap. This may be referred to as thresholding the ROIs.

In some instances, to train the ML model, the ML model may determine a degree of alignment between an ROI and the reference ROI 500. In some instances. Determining the degree of alignment may include determining a metric that reflects an amount of overlap and/or fit of the ROI to the ground truth area 500. In some instances, this may include determining an intersection over union, although other techniques for determining an amount of overlap/an error of the ROI generated by the ML model may be used.

In this example, the ML model may determine that the example ROI 400' fits the ground truth area 500 well, e.g., signified by a degree of alignment 502 that indicates a 98% degree of alignment/fit of the example ROI 400'. The example confidence score 402 is appropriately high, in view of the high degree of alignment. In some instances, a "good" fit may be defined to be a degree of alignment of 0.70 or more. This value (0.70) may be considered a threshold degree of alignment although it is contemplated that other values may be used such as, for example, 0.80, 0.50 and/or 0.60. Here, example 400' would be subject to NMS reassignment. In other words, even though 400 is not part of the central 30%, it produces a "good" ROI and, as such, should not be penalized (if selected as a hard example).

Similarly, the ML model may determine that the example ROI 404' fits the reference ROI 500 well, albeit somewhat worse than example ROI 400', by determining that the ROI 404' is associated with a degree of alignment 504 of 0.90. Nonetheless, example 404 would be subject to NMS reassignment as well (if selected as a hard example).

The ML model may also determine that example ROI 408' fits the reference ROI 500 poorly, by determining that the ROI 408' is associated with a degree of alignment 506 (i.e., 0.62 in this example) that fails to meet or exceed a threshold degree of alignment (e.g., 0.70). As such, even though the example portion 408 falls within the reference ROI 500, it constitutes a valid hard example.

Likewise, the ML model may also determine that the example ROI 412' fits the reference ROI 500 poorly, by determining that the ROI 412' is associated with a degree of alignment 508 (i.e., 0.47 in this example) that fails to meet or exceed a threshold degree of alignment (e.g., 0.70). Since the confidence score is low (i.e., 0.13 in this example), the ML model may determine the example 408/408' as a valid hard example.

Figure 6A:
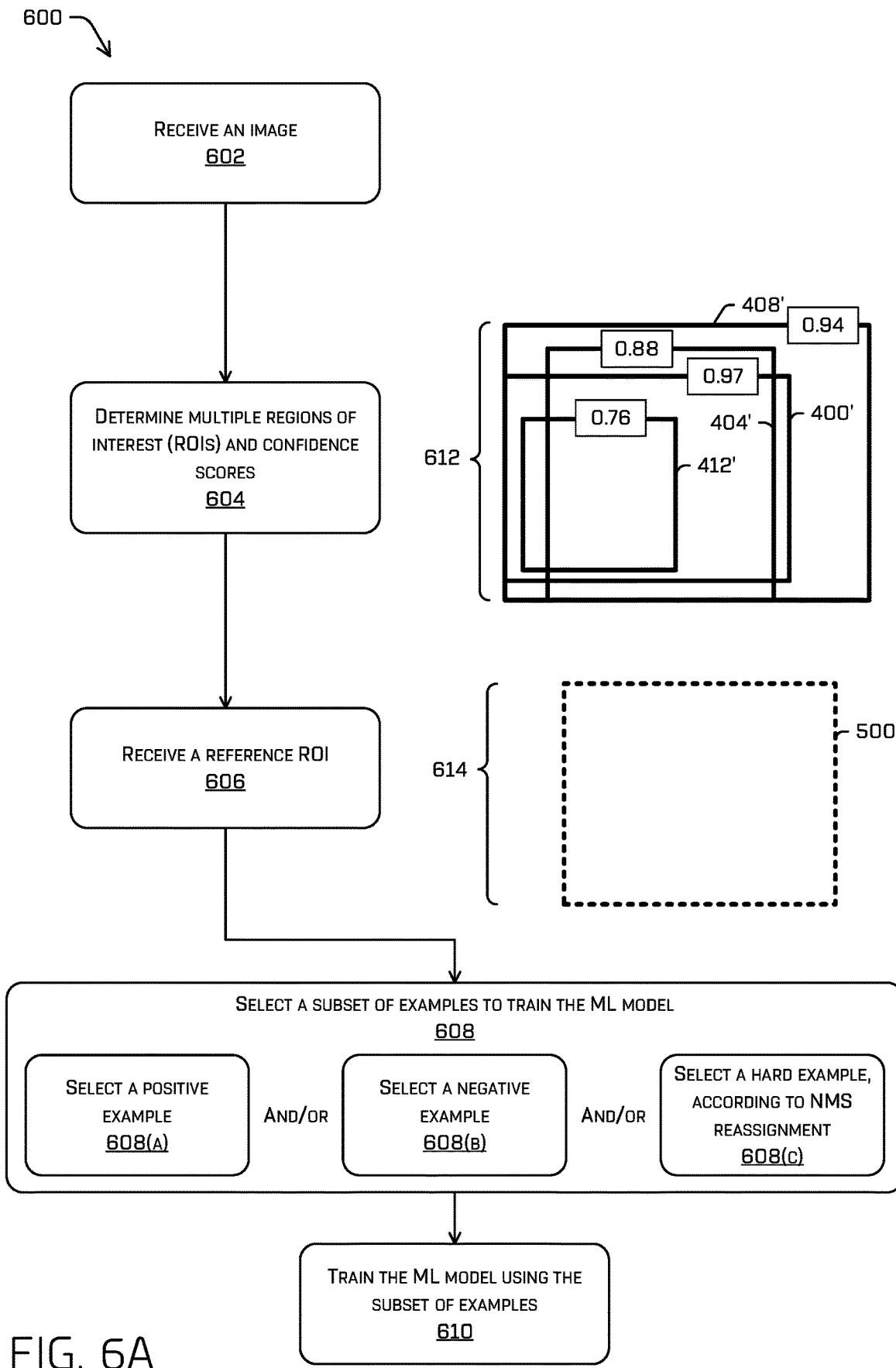
FIGS. 6A and 6B illustrate a flow diagram of an example process for training an ML model according to non-maximum suppression replacement techniques discussed herein.
Figure 6B:
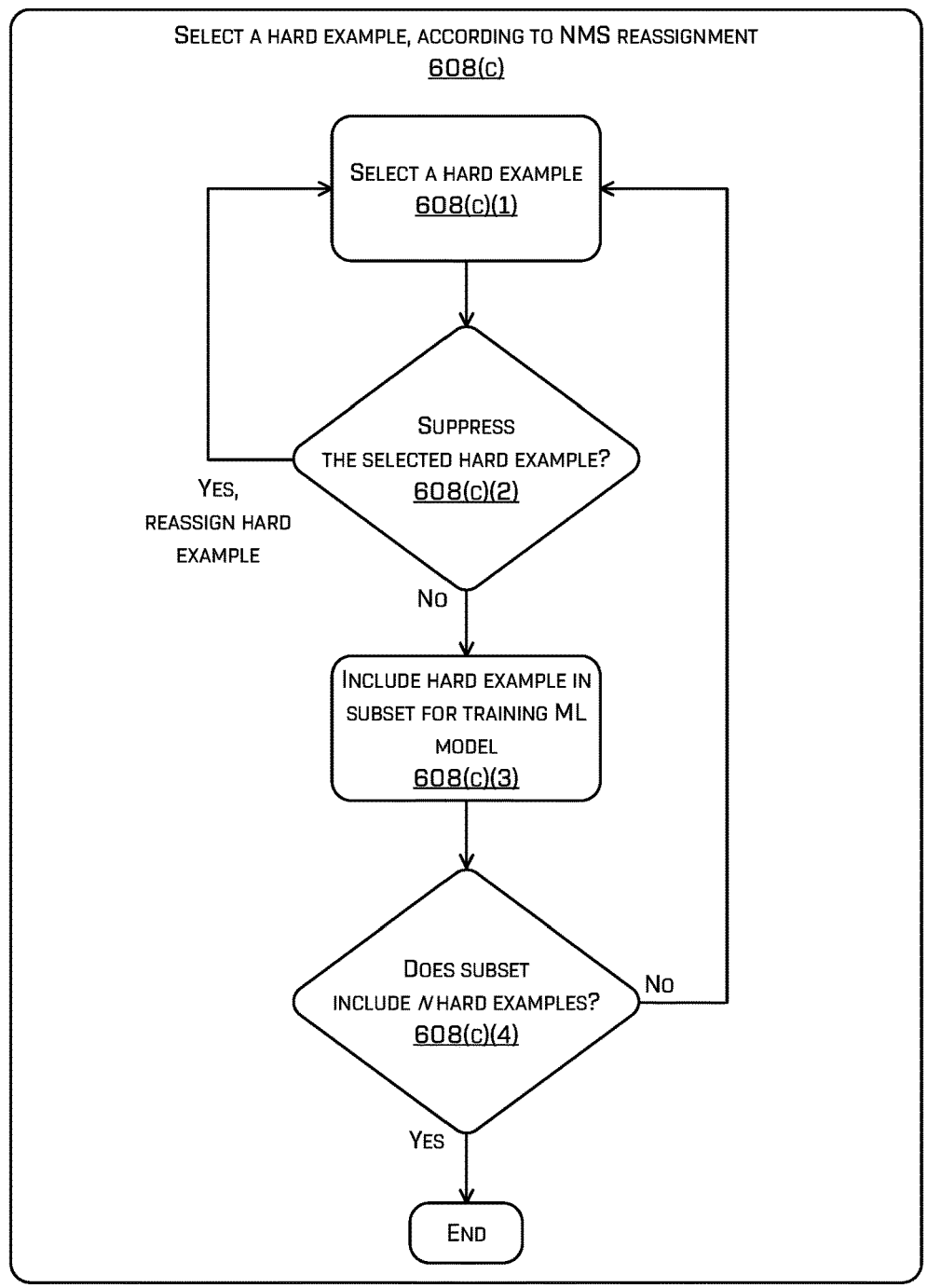

FIGS. 6A and 6B illustrates a pictorial flow diagram of an example process 600 for training an ML model based at least in part on a subset of ROIs selected via NMS reassignment. At operation 602, the example process 600 may include receiving an image, according to any of the techniques discussed here.

At operation 604, the example process 600 may include determining multiple ROIs (e.g., ROIs 400', 404', 408', 412', as illustrated in an example 612) and multiple confidence scores associated therewith, according to any of the techniques discussed herein. For example, the ML model may generate an output grid (or more generally, may output a feature map) for the image that includes output cells (or more generally, that includes a plurality of features), and may determine an ROI (and confidence score associated therewith) per classification for an output cell (e.g., each output cell). As a non-limiting example, each cell of the output grid may have, for example, ROIs and confidences for each of a vehicle classification, a bicycle classification, a pedestrian classification, and the like, though any combination of classifications is contemplated. This may include generating ROIs like those depicted in FIG. 6A (400', 404', 408', 412'), determined for the example classification "car."

At operation 606, the example process 600 may include receiving a reference ROI (e.g., reference ROI 500, as illustrated in an example 614), according to any of the techniques discussed herein. The reference ROI 500 (e.g., a reference region) may be ground truth received via human labeling or any other suitable method of establishing a ground truth for an area of the image that represent an object in the image. In some instances, the reference ROI may indicate an area of the image associated with a classification for which the ROIs were generated. For example, ROI 500 may indicate the area of the image representing the classification "car," as discussed above. At operation 608, the example process 600 may include selecting a subset of examples to train the ML model, according to any of the techniques discussed herein. This may include determining a portion (e.g., an output cell) of the image, from among one or more of all the portions of the image, to include in a subset of examples for training the ML model. For example, the example process 600 may include determining a positive example (608(*a*)) to include in the subset, determining a negative example (608(*b*)) to include in the subset, and/or determining a hard example (608(*c*)) to include in the subset, using NMS reassignment. These operations are discussed in more detail below. In some instances, operation 608 may additionally or alternatively randomly selecting examples for inclusion in the subset of examples for training the ML model.

Operation 608(*a*) may include determining that a confidence score for an ROI is a maximum confidence score and/or meets or exceeds a confidence score threshold and that a degree of alignment of the ROI to a reference ROI exceeds a threshold degree of alignment (e.g., which may indicate that the ROI correctly identifies an object represented in the image). Operation 608(*a*) may include selecting, as a positive example and based on this determination, the output cell and/or any of the data generated by the ML model associated therewith for inclusion in the subset for training the ML model.

Operation 608(*b*) may include determining that a confidence score for an ROI is a minimum confidence score and/or does not meet a confidence score threshold and that a degree of alignment of the ROI to a reference ROI does not meet a threshold degree of alignment. Operation 608(*a*) may include selecting, as a negative example and based on this determination, the output cell and/or any of the data generated by the ML model associated therewith for inclusion in the subset for training the ML model.

Turning to FIG. 6B, operation 608(*c*) may include (608(*c*)(1)) selecting a hard example, generally. Hard examples may be referred to as examples which the machine learned model gets the most wrong. For instance, such hard examples may correspond to cells having a very high confidence of a corresponding ROI, but incorrectly identify such an ROI or should otherwise be penalized based on their corresponding output. Generally, hard examples may be negative examples. Selecting a hard example may include identifying those portions of the image (e.g., one or more cells) that produced an incorrect ROI (or should otherwise be penalized), but are associated with a high confidence score; sorting the portions by confidence scores; and selecting, as a hard example and from the sorted remaining ROIs, a top number, n, of associated portions. However, it is understood that any suitable hard example selection method is contemplated.

Once a hard example has been selected, operation 608(*c*) may include (608(*c*)(2)) determining whether to suppress the selected hard example, according to any of the techniques discussed herein. In some instances, e.g., those in which only a portion of cells associated with an object are trained to output associated data (e.g., and ROI), such hard examples (when naively selected) may, in fact, represent good examples to train on (e.g., the cells have correctly identified an ROI associated with the object, but are penalized as not belonging to, e.g., a central 30% of the object). In such instances, operation 608(*c*)(2) may determine to suppress the selected hard example if the selected hard example corresponds to a portion of the image that is within the boundary of the ROI region (or otherwise has been associated with a valid output, e.g., an ROI that corresponds to an object associated with that portion of the image). Based on determining to suppress the selected hard example, the operation 608(*c*)(2) may include discarding the selected hard example and returning to operation 608(*c*)(1) to select a new hard example (e.g., the next most wrong example according to the sorting discussed above). For example, discarding the selected hard example may include excluding the selected hard example from the subset for training the ML model and excluding the selected hard example from the sorted ROIs so that it cannot be selected upon a subsequent selection. In some instances, the determination to suppress the selected hard example may additionally or alternatively include determining that a degree of alignment of the ROI associated with the selected hard example to the reference ROI meets or exceeds a degree of alignment threshold. In some instances, such determinations may be made by determining whether the ROI would have been suppressed under NMS. That is to say, that the NMS operation may be used to determine those examples which have high confidences and that are associated with an ROI which corresponds to the reference ROI and to exclude them from what otherwise would be a hard example.

In some instances, operation 608(*c*)(2) may suppress selection of hard examples for portions of the image within the reference ROI and that produce ROIs that have "good" degrees of alignment. For example, ROIs 400' and 404' are examples that, if chosen as hard examples, may be suppressed at operation 608(*c*)(2) since they were produced from portions of the image within the reference ROI 500 and they are each associated with degrees of alignment that exceeds a threshold degree of alignment, indicating a "good" fit of the ROIs to the reference ROI 500.

In at least some instances, as opposed to suppressing (e.g., discarding) such examples, such examples may be reassigned as positive examples. In some instances, determining to suppress a hard example may include altering a target confidence score associated with the hard example. For example, ROIs produced for portions of the image within the central 30% of a reference ROI may be associated with a maximum target confidence score (e.g., 1.0) based on the determination that they are representative of ground truth. However, when a hard example is suppressed, the target confidence score associated with that hard example and used to train using the hard example may be modified. For example, if a hard example was selected that is determined to be suppressed, the target confidence score for that hard example may be changed to 1.0. Training may then be conducted using the suppressed hard example and the new target confidence score, 1.0. In other words, the selected hard negative example may be, instead, reassigned as a positive example, thereby backpropagating loss. If the selected hard example is not suppressed (i.e., the example is a true hard negative), the confidence loss may be set to 0 such that the example is trained to output any box, but having a correspondingly low confidence value.

In at least some examples which implement a 30% central region as ground truth, these techniques improve the accuracy of the ML model over techniques that merely disregard examples generated from a remaining 70% of the reference ROI (e.g., that portion of the object which is not part of a central 30%) which are naively selected based on ranking alone. These techniques also improve the accuracy of the ML model over techniques that train the ML model by penalizing examples produced outside the central 30%, since the portions of the image outside the central 30% and within the reference ROI may produce ROIs of an adequate degree of alignment—in other words, penalizing such portions for producing adequate ROIs may teach the ML model to learn a distinction that does not exist in reality (e.g., the portion for which an adequate ROI was produced does in fact correlate to the representation of an object in the image, and penalizing this teaches the ML model to make a distinction that doesn't exist in reality).

At operation 610, the example process 600 may include training the ML model using the selected subset of examples, according to any of the techniques discussed herein.

In at least some instances, training the ML model may include at least two stages, where the first stage may omit such NMS reassignment and a second stage that follows the first stage may include NMS reassignment. In such examples, during the second stage, ROIs of various portions of the image (cells) may be suppressed under NMS, such that non-suppressed ROIs may be used as the reference ROIs 500 for training the ML model in the same or a subsequent stage.

In some instances, the first stage may include providing a first batch of images to the ML model for training, and the second stage may include providing a second batch of images to the ML model for training. That is to say, different batches of data may be used to subsequently train the model.

In some instances, training the ML model in the second stage may incorporate a focal loss function. In some instances, the focal loss function may include a cross entropy loss function that adds a factor, $(1-p_t)^\gamma$, where $\gamma$ is >0 (e.g., $\gamma=1$, $\gamma=2$, $\gamma=5$) to more heavily penalize hard, misclassified examples than well-classified examples (e.g., those examples where $p_t > 0.5$ or $p_t > 0.7$). For example, the focal loss function may be evaluated for ROIs using the following equation:

$$FL(p_t) = -(1-p_t)^\gamma \log(p_t)$$

where:

$$p_t = \begin{cases} p, & \text{if } y = 1 \\ 1-p, & \text{otherwise} \end{cases}$$

and $y \in \{\pm 1\}$ denotes the ground-truth class and $p \in [0,1]$ is the ML model's confidence score for the class with label $y=1$. Functionally, this downweights the error calculated by the cross entropy loss function for ROIs that are associated with a low error (e.g., for $p_t > 0.5$, confidence score is close to the optimal score, ROI fits the ground truth well) and progressively penalizes larger errors. Simply, the more confident the ML model was about an ROI it produced that was actually incorrect, the more the cross entropy loss is left unchanged by the focal loss function. Whereas, the focal loss function downweights the error calculated for a well-classified example so that, even if there are many well-classified examples, the effect of the minimal errors each produces will have less of an effect training. In some instances, the loss function of operation 608 may include a cross entropy loss function, a Huber function, a mean-squared error calculation, etc.

In some instances, three stages are contemplated wherein the first stage omits any focal loss and NMS reassignment, whereas the second and third stages incorporate focal loss and/or NMS reassignment. In at least some instances, images may be scaled differently at one or more of the stages. As a non-limiting example, cropped images of size 240×240 may be used in the first batch when training in the first stage, whereas image crops having size 960×600 may be used in a third batch used to train the model in a third stage. In general, an image crop size, a number of iterations, learning rate, batch size, and/or balancing may vary from stage to stage.

In some instances, the first batch of images and/or the second batch of images may be data balanced to ensure that the ML model is being trained to accurately detect objects of different types. ML models that are continuously exposed to one object classification may slowly "forget" (e.g., become less accurate in detecting) objects of a different type to which they are exposed less frequently. Furthermore, where few examples exist in a dataset of one particular class (e.g., if cars heavily dominate a dataset with respect to bicycles), the ML model may optimize losses by simply stating that there are no bicycles in any image. Therefore, in some instances, the first batch of images and/or the second batch of images may include a first predefined number of images that are associated with a first object classification (e.g., each of the first predefined number of images include at least one pedestrian) and a second predefined number of images that are associated with a second object classification (e.g., each of the second predefined number of images include at least one biker), though any number of classes and relative weights are contemplated. For example, an input batch may include 32 images, which may include at 4 of each type of object the ML model is trained to detect, e.g., 4 bikes, 4 cars, 4 pedestrians, 4 night images, 4 day images, etc. In some instances, training the ML model may include receiving an image, determining an object classification associated with the image, and associating the image with a training queue that is associated with the object classification. At training time, the batches may be composed from outputs of multiple queues, where each queue is associated with a different object classification and/or image condition (e.g., night/day, obstruction). By ensuring that the ML model is continuously training on a variety of object classifications, the ML model is less likely to "forget" an object classification.

Example Response Curves & Restricted Multi-Scale Inference

Figure 7A:
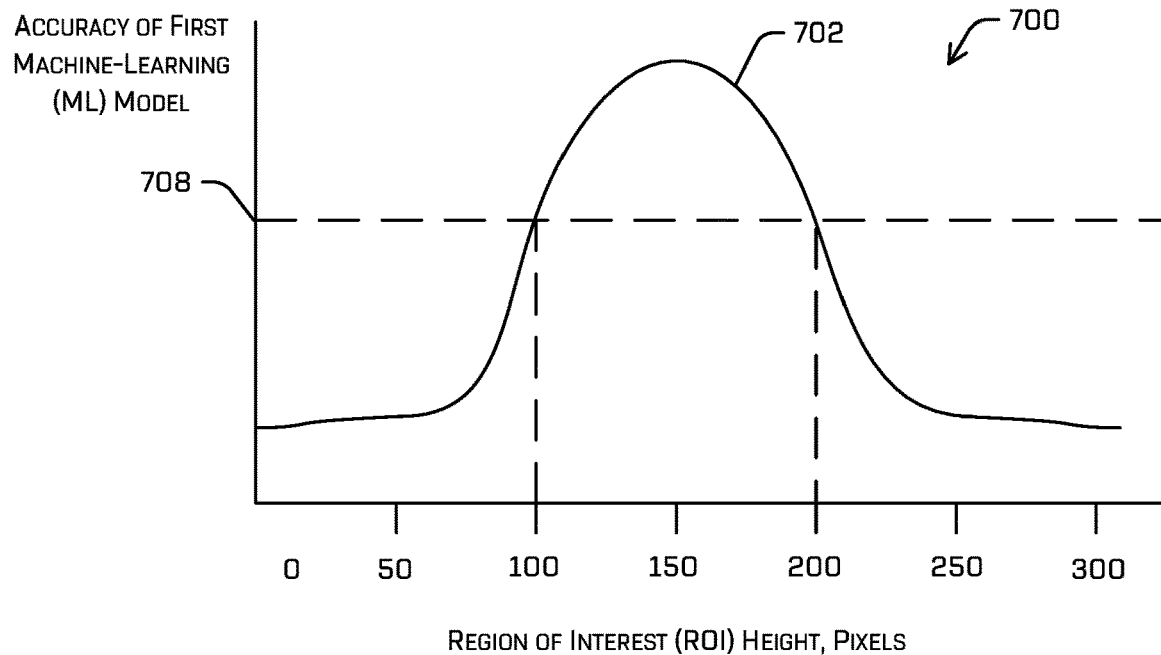
FIG. 7A illustrates an example first response curve of a first ML model to objects having various sizes within image(s).
Figure 7B:
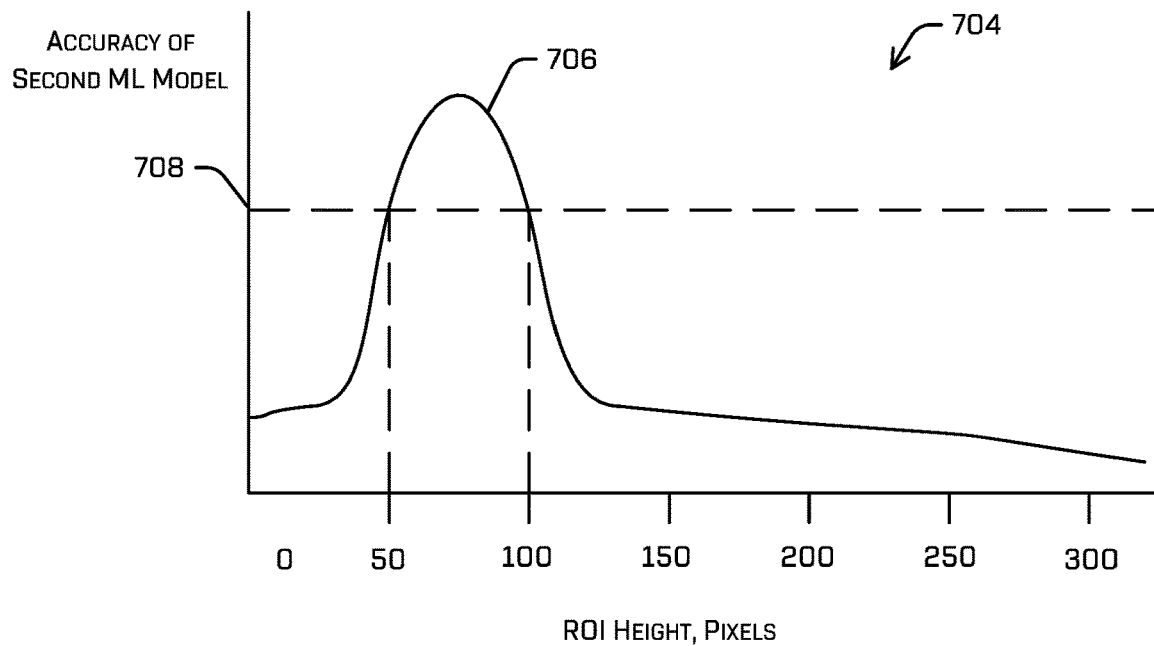
FIG. 7B illustrates an example second response curve of a second ML model to objects having various sizes within image(s).

FIGS. 7A and 7B illustrate an example of suppressing ROI output sizes based on scale. Generally, neural networks may be associated with a receptive field. Such a receptive field may be indicative of how much data of an input signal is used when making an inference. If, for example, the receptive field of a model is not large enough, larger sized objects may not be adequately determined using the model. As above, though a larger model may be employed to detect all objects, such a model would require significant resources and processing, which limits their application (e.g., such a model would not be able to be used in an autonomous vehicle application due to the processing time and memory requirements). To resolve these limitations, one or more smaller networks may be employed (i.e., a network having a smaller memory footprint and/or processing requirements). Each such network may be associated with a particular accuracy for various ROI sizes and constrained to only output ROIs within such a range. Though discussed in the context of sizes, any data stratification (or other metric) is contemplated herein. As non-limiting examples, such techniques illustrated in any of FIGS. 7-8 may further select optimal networks for any one or more of sizes of regions of interest, local contrast, or the like.

As illustrated in FIG. 7A, a first graph 700 including an example response curve 702 of a first ML model to objects having various sizes within image(s) of a first scale. FIG. 7B illustrates a second graph 704 including a second example response curve 706 of a second ML model to objects having various sizes within image(s) of a second scale. The y-axis of the first graph 700 and the second graph 704 may indicate an accuracy of the model with respect to an ROI and/or confidence score to identify an object in an image and the x-axis of the first graph 700 and the second graph 704 may indicate a size of the object in the image, a size of the ROI, and/or a size of the image. In one example, the x-axis may indicate the size of the ROI.

In some instances, the techniques may include determining a response curve associated with a first ML model that indicates the accuracy of the first ML model to classify (e.g., produce an ROI and/or confidence score for) an object over apparent object size in an image. To produce this response curve, the techniques may include providing, as input to the first ML model, a plurality of objects (represented in one or more images); receiving, as output from the first ML model, a plurality of ROIs and/or confidence scores associated with the plurality of objects; and determining an accuracy for each of the ROIs and/or confidence scores (e.g., by comparing to a ground truth, by computing a degree of alignment for each ROI to a respective ground truth area. To produce the response curve, the techniques may include associating a size of an ROI (e.g., a height and/or width, an area) with the accuracy of the ROI (e.g., a degree of alignment associated with the ROI, a disparity between the degree of alignment and the confidence score). These accuracy/ROI size pairs may be amalgamated for the ROIs determined for the first ML model from a batch of images.

In some instances, a batch of thousands or, even, hundreds of thousands of images may be provided, as input, to the first ML model so that this response curve may be determined. Once the first ML model has processed the batch, the techniques may include identifying a range of ROI sizes associated with accuracies that meet or exceed a threshold accuracy, and associating the range of sizes with the first ML model. This range of sizes may indicate that the first ML model determines "good" ROIs for objects in that range of sizes. In some instances, the first ML model may output ROIs that have sizes within the size range and may suppress other ROIs determined by the first ML model. In some instances, additionally or alternatively to plotting accuracy over ROI size, the accuracy of ROIs may be plotted over ground truth size, image portion size, and/or image size.

For example, the threshold accuracy may be indicated by 708, the first ML model may be associated with response curve 702, and a second ML model may be associated with response curve 706, similarly generated according to the techniques discussed above. In at least some instances, the first and second ML models may be the same model, only differing in the input scale. According to the depicted example, a first range associated with the first ML model may only output ROIs having a pixel height between 100 and 200 pixels based on an input image of size 900×900, whereas a second range associated with the second ML model may only output ROIs having a height between 50 and 100 pixels based on an input image of size 300×300. In some instances, the first response cure 702 and the second response curve can be associated with different threshold accuracy levels.

Of course, any number of models and/or scales may be determined for various ranges of input and output sizes. Images of various scales (greater than, equal to, or less than the original image size) may be input to various models (either sequentially or substantially simultaneously) to detect, classify, and/or segment objects in the images.

In at least one example, designation of the model, ranges, or stratification to be selected may be determined, based at least in part, on a tertiary model. As a non-limiting example, a model may be trained to discriminate between what scale and/or what model to use for determining the desired output.

Figure 8A:
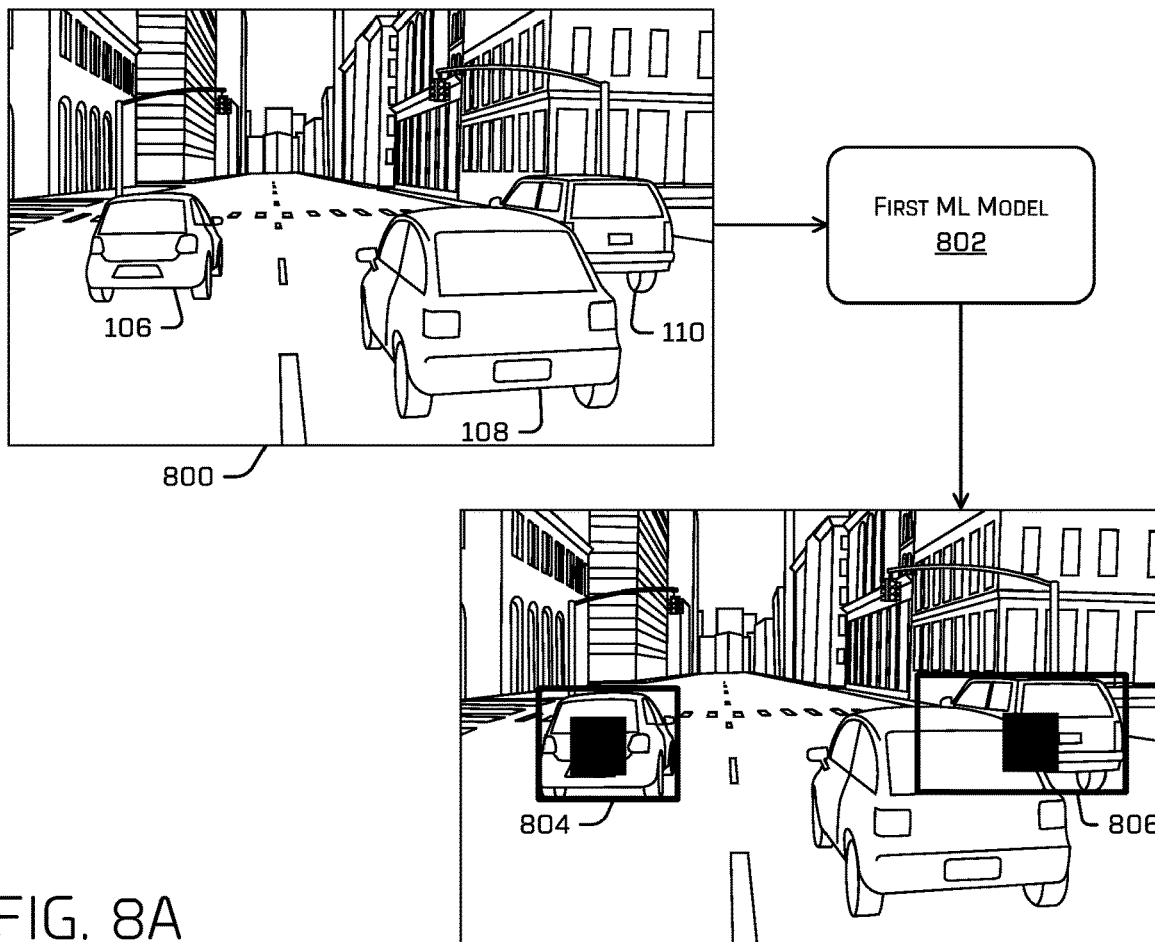
FIG. 8A illustrates an example image provided, as input, to a first ML model, and ROI(s) generated by the first ML model responsive to receiving the first scaled image, according to the techniques discussed herein.

FIG. 8A illustrates a first scaled image 800 provided, as input, to a first ML model 802, a first scaled image and two ROIs (804 & 806) generated by the first ML model responsive to receiving the first scaled image, according to the techniques discussed herein. In some instances, the first ML model 802 may be associated with a first range of sizes and may have generated an ROI for vehicle 108, but the ROI may have fallen outside the first range of sizes and been suppressed by the first ML model. Whereas ROI 804, corresponding to vehicle 106, and ROI 806, corresponding to vehicle 110, may fall within the first range of sizes and may therefore be output by the first ML model. In some instances, the first scaled image may be scaled by a factor of 1 (e.g., the first scaled image is unscaled).

Figure 8B:
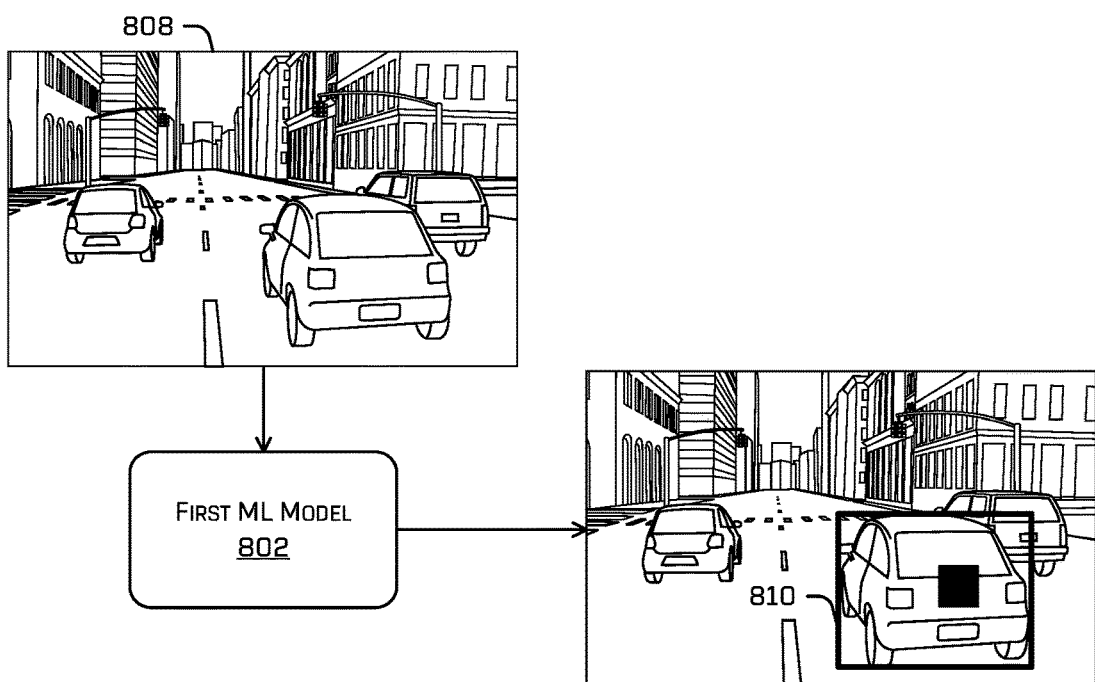
FIG. 8B illustrates the example image of FIG. 8A, rescaled as a second scaled image, and provided, as input, to the first ML model, and ROI(s) generated by the first ML model responsive to receiving the second scaled image, according to techniques discussed herein.

FIG. 8B illustrates an example second scaled image 808 provided, as input, to the first ML model, and an ROI 810 generated by the first ML model responsive to receiving the second scaled image, according to techniques discussed herein. In some instances, the second scaled image is scaled by a scale coefficient that is less than 1, resulting in an image of a smaller scale than that of example image 800. In the depicted example, since the image has been scaled down, the ROI corresponding to vehicle 108 now falls within the first range of sizes associated with the first ML model and the ROIs associated with vehicles 106 and 110 have fallen outside the first range of sizes and are therefore suppressed by the first ML model 802 in FIG. 8B. In some instances, the second scale factor (and/or any additional scale factors) may be chosen such that ROIs will not be redundantly produced for a same object when a same image is provided to the first ML model at two different scales.

In some instances, the first range of sizes may be based at least in part on a receptive field of the first ML model. For example, the representation of vehicle 108 in example image 800 may be too large to fit the receptive field, but the representation of vehicle 108 in example image 808, once scaled down, may fit into the receptive field of the first ML model.

In some instances, the first range of sizes and/or the second range of sizes can be based in part on a regression model (or other machine learned model) to optimize the precision, recall, and/or accuracy of the various ML models used to differentiate between various sizes (or between various metrics and/or data stratifications, discussed below).

Figure 8C:
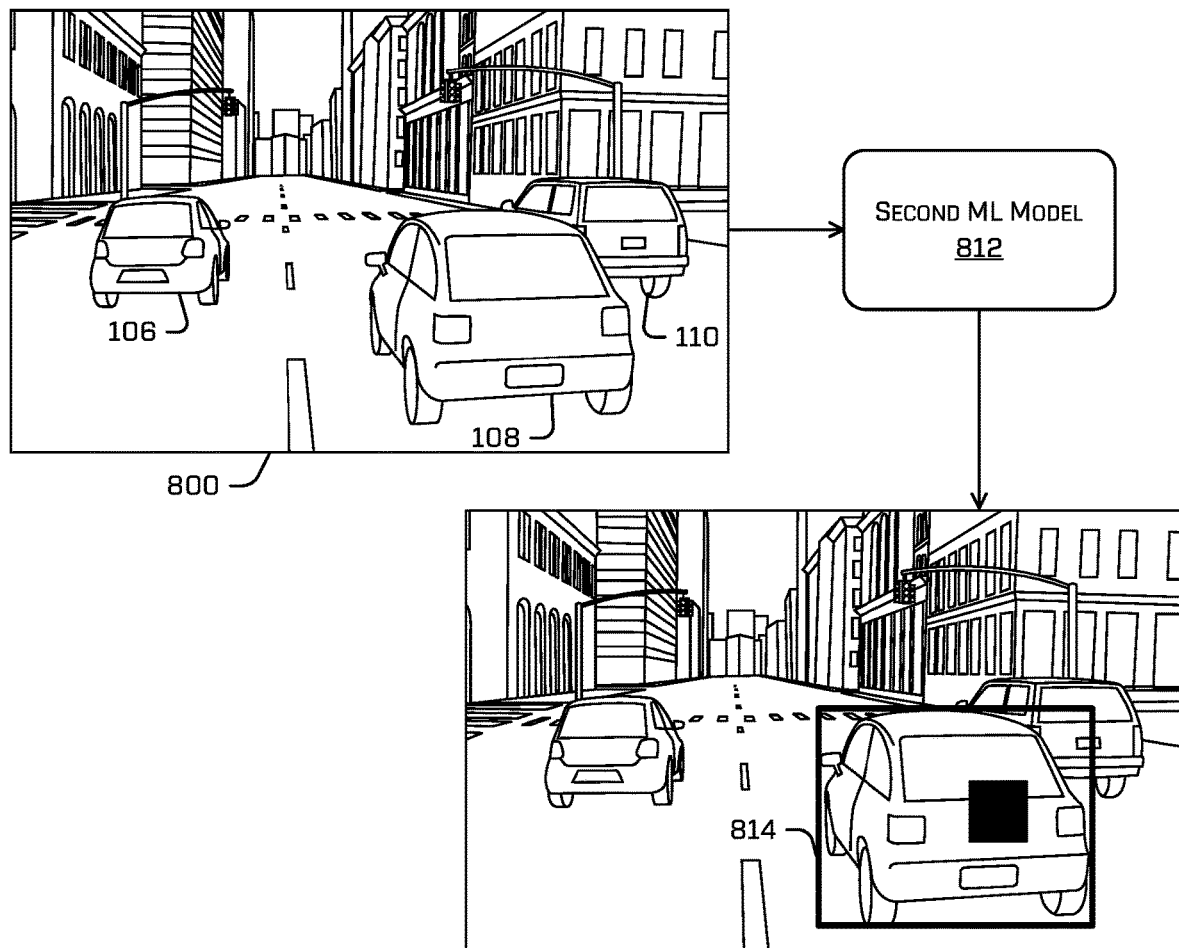
FIG. 8C illustrates the example image of FIG. 8A provided, as input, to a second ML model, and ROI(s) generated by the second ML model responsive to receiving the example image, according to the techniques discussed herein.

FIG. 8C illustrates an additional or alternate instance for detecting all the objects in an image. Instead of iteratively providing an image to an ML model, determining ROIs, and outputting ROI(s) having size(s) within a first range of sizes, scaling the image, providing the scaled image to the ML model, and so on (as depicted in FIG. 8B), the example image 800 may be provided to a second ML model 812 associated with a second range of sizes so that the second ML model 812 may determine an ROI 814 for the object that isn't detected by the first ML model (e.g., vehicle 108 in this example). In some instances, an image may be provided to multiple detectors, where each detector is associated with a different range of sizes and outputs ROIs within that range of sizes; and/or this technique may be combined with providing a first scaled image to a first detector, receiving a first output from the first detector, scaling the first scaled image as a second scaled image, providing the second scaled image to the first detector, and receiving a second output from the second detector.

Although FIGS. 8A, 8B, and 8C are discussed in the context of varying a size of input images and/or in the context of selecting a ML model based on expected output sizes, any metric and/or data stratification can be used to select the appropriate ML models and/or input scales. For example, various metrics can include, but are not limited to, one or more of contrast (e.g., local contrast of regions and/or pixels of an image), brightness, number of channels, color (e.g., RGB, black and white, grayscale, etc.), size (e.g., width and height), area, a size of a grid, a number of objects identified in an image, time of day (e.g., day/night), weather (e.g., rain, sun, snow, fog, etc.), classification, and the like.

In this manner, a same ML model and/or different ML models may produce ROIs for objects of different sizes at a high degree of accuracy and without training a large neural network that would take too much compute time to be useful for real-time applications, such as controlling an autonomous vehicle.

Example Instance Segmentation

Figure 9A:
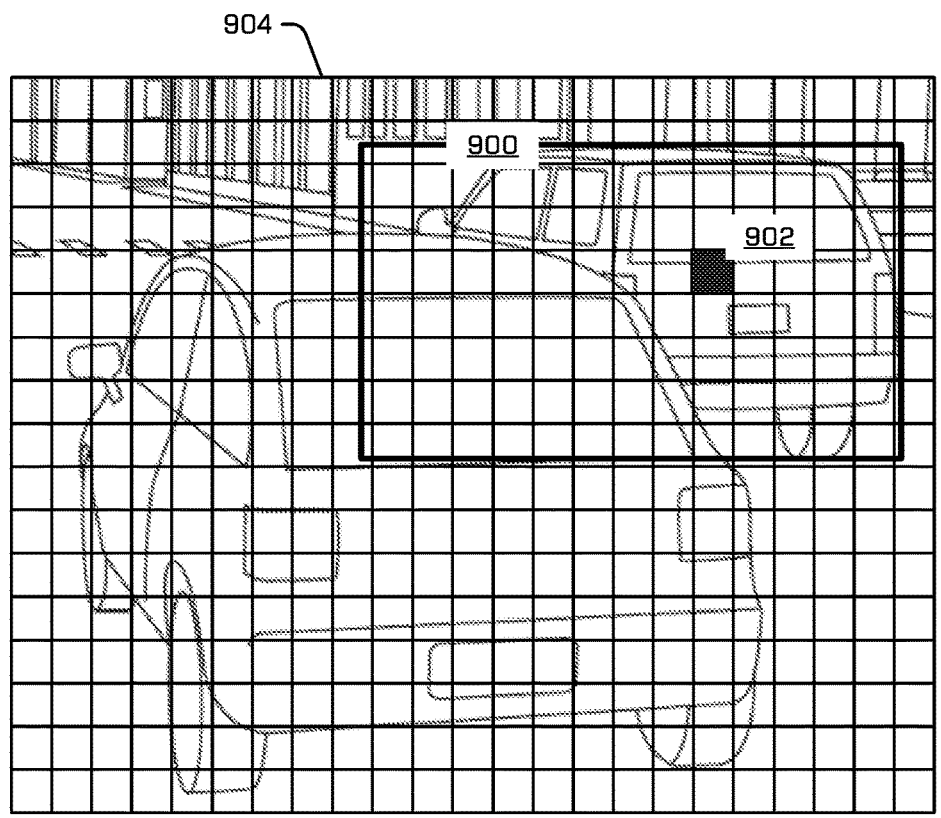
FIG. 9A illustrates an example ROI generated for a portion of an example image.

FIG. 9A illustrates an example ROI 900 determined by an ML model for a portion 902 of an example image 904. As with the examples illustrated above (e.g., with respect to FIG. 5) an ML model may be trained to output ROIs. However, unlike the models trained in the above examples, the ML model illustrated in FIG. 9A may be trained, instead of using ROIs associated with a central 30%, but those ROIs associated with pixels in a mask of an object. Specifically, an image mask and a corresponding ROI for an object in an image may be used as ground truth when training the ML model. Such a training region of interest may be determined, for example, based on an associated ROI with the mask (e.g., a bounding box based at least in part on the pixels of the mask). As illustrated in FIG. 9A, a portion 902 (which may be a pixel) of the image 904 may form part of a mask of an object and have an associated ROI 900.

Figure 9B:
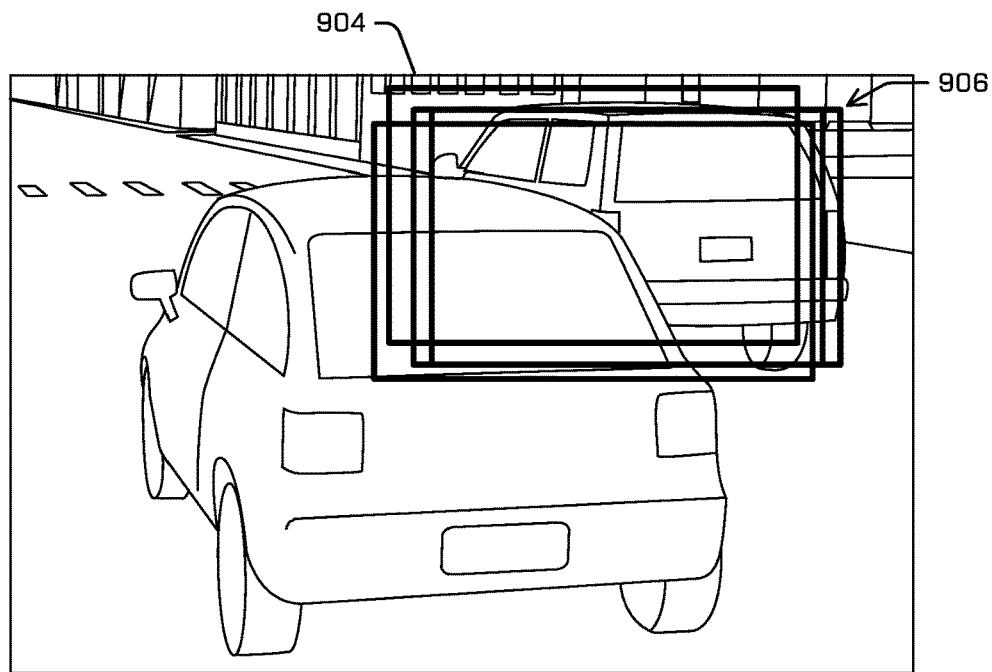
FIG. 9B illustrates an example plurality of ROIs associated with a same object in the example image.

FIG. 9B illustrates an example plurality of ROIs 906 associated with a same object in the example image 904 (i.e., vehicle 110 in this example). In some instances, the ML model may receive the example image 904 and may produce multiple ROIs, including the example plurality of ROIs 906 and/or confidence scores associated therewith for every portion and/or pixel of the image 904.

In some instances, as above, the ML model may determine a single ROI to be associated with the object (e.g., object 110) out of the plurality of ROIs determined. In at least one example, such a detection may be accomplished using NMS. Similar to examples discussed herein, every pixel or portion may output an ROI and the plurality of ROIs may be suppressed with NMS (e.g., those ROIs that are not associated with a maximum confidence level may be suppressed). The ML model may substantially simultaneously determine an ROI to associate with vehicle 110 and a mask that identifies particular portions of the image that are associated with the object (e.g., pixels that represent the object) based at least in part on the determination of the ROI for output.

In at least one instance, such an ML model may retain an indication of the pixels and/or regions which were suppressed during the NMS. All such pixels and/or portions of the image may be associated with a mask (instance segmentation) of the object. In some instances, the portion of the image that produced the maximal ROI that was not suppressed by NMS may also be associated with the mask.

Figure 9C:
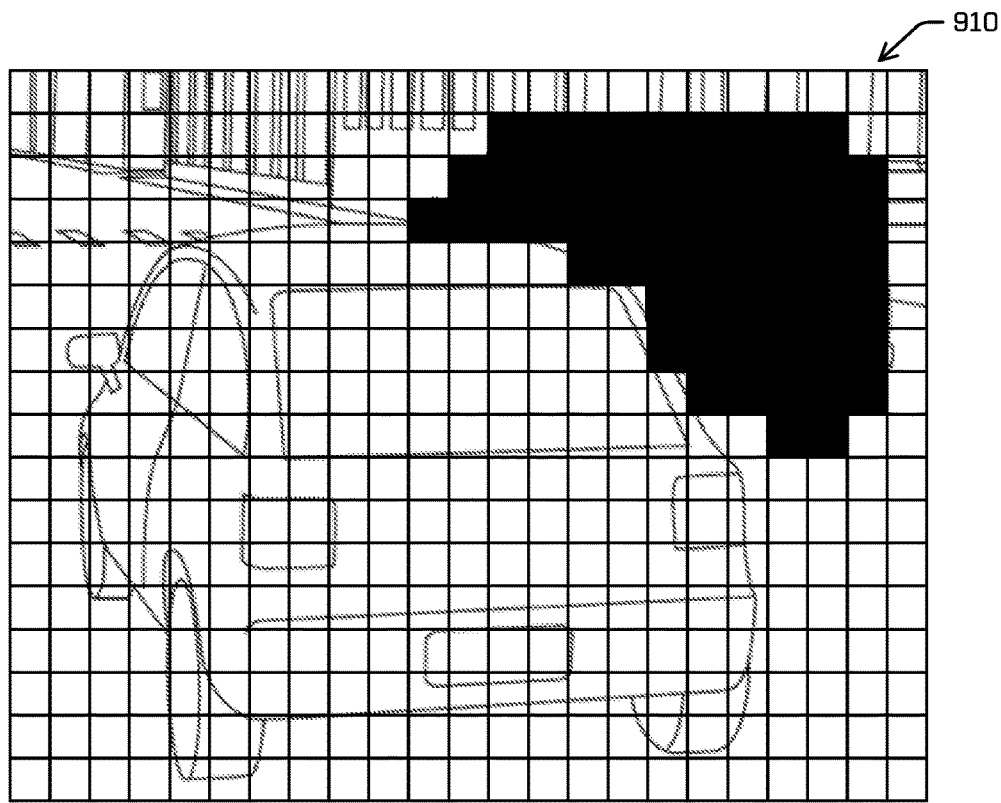
FIG. 9C illustrates an example object segmentation, according techniques discussed herein.
Figure 9C:
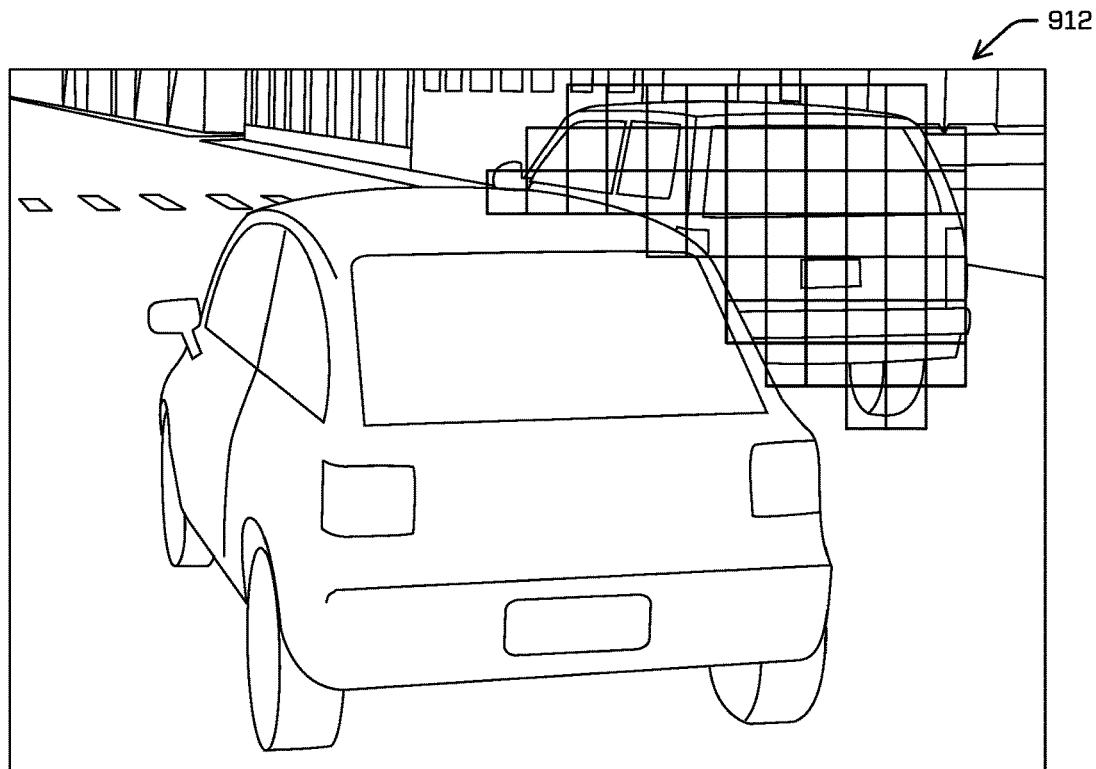

FIG. 9C illustrates two representations (910 & 912) of an example instance segmentation (i.e., a mask in the depicted example) identifying an object, according techniques discussed herein. Representation 910 includes darkened portions of the image that the example mask identifies as representing the object (i.e., vehicle 110). For the sake of clarity, representation 912 is included in FIG. 9C to show that the portions of the image included in the mask as positively identifying an object correspond to the vehicle 110. In some instances, each of the darkened portions of the image of representation 910 may correspond to a portion of the image for which the ML model generated an ROI that was suppressed during NMS, or otherwise associated with an ROI of such an object (e.g., the ROI associated with the maximum confidence score). In some instances, the autonomous vehicle may use the ROI and/or the mask to generate a trajectory for controlling motion of the autonomous vehicle.

This technique is an improvement over former techniques that require a separate operation to perform instance segment. Instead, the techniques discussed herein perform both object detection and image segmentation in the same compute time it takes to perform the object detection using conventional techniques. In some instances, the ML model described herein runs in 20 milliseconds.

Example Architecture

Figure 10:
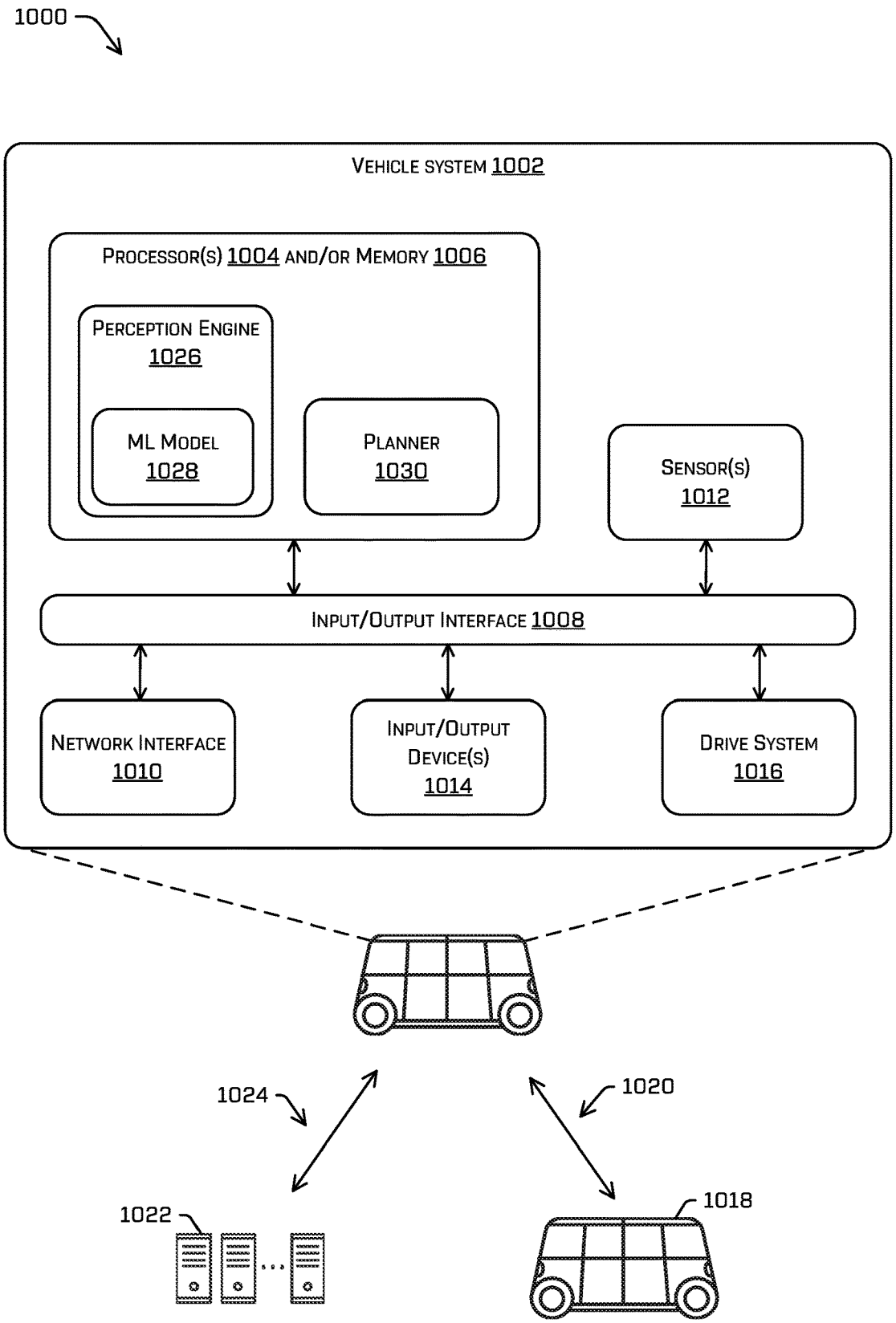
FIG. 10 illustrates an example system for implementing the techniques discussed herein.

FIG. 10 is a block diagram of an example architecture 1000 including an example vehicle system 1002 for controlling operation of at least one vehicle, such as an autonomous vehicle, according to any of the techniques discussed herein. In some instances, the vehicle system 1002 may represent at least a portion of autonomous vehicle 104. In some instances, this architecture may be used to control an autonomous vehicle, based at least in part on the ROIs, image segments, and/or confidence scores discussed herein.

In some instances, the vehicle system 1002 may include processor(s) 1004 and/or memory 1006 (which may collectively represent computing device(s) 118). These elements are illustrated in combination in FIG. 10, although it is understood that they may be separate elements of the vehicle system 1002, and that components of the system may be implemented as hardware and/or software, In some instances.

Processor(s) 1004 may include a uniprocessor system including one processor, or a multiprocessor system including several processors (e.g., two, four, eight, or another suitable number). The processor(s) 1004 may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor 1004 may commonly, but not necessarily, implement the same ISA. In some instances, the processor(s) 1004 may include a central processing unit (CPU), a graphics processing unit (GPU), Field Programmable Gate Arrays (FPGA), Application Specific Integrated Circuit (ASIC), or a combination thereof.

The example vehicle system 1002 may include memory 1006. In some instances, the memory 1006 may include a non-transitory computer readable media configured to store executable instructions/modules, data, and/or data items accessible by the processor(s) 1004. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 1002 via an input/output ("I/O") interface 1008. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface 1010.

Furthermore, though illustrated as a single unit in FIG. 10, it is understood that the processor(s) 1004 and memory 1006 may be distributed among multiple computing devices of the vehicle and/or among multiple vehicles, data centers, teleoperation centers, etc.

In some instances, the input/output ("I/O") interface 1008 may be configured to coordinate I/O traffic between the processor(s) 1004, the memory 1006, the network interface 1010, sensor(s) 1012, I/O devices 1014, drive system 1016, and/or any other hardware of the vehicle system 1002. In some instances, the I/O devices 1014 may include external and/or internal speaker(s), display(s), passenger input device(s), etc. In some instances, the I/O interface 1008 may perform protocol, timing, or other data transformations to convert data signals from one component (e.g., the non-transitory computer readable media) into a format suitable for use by another component (e.g., processor(s)). In some instances, the I/O interface 1008 may include support for devices attached through various types of peripheral buses, such as the Peripheral Component Interconnect (PCI) bus standard, the Universal Serial Bus (USB) standard, or a variant thereof, for example. In some implementations, the function of the I/O interface 1008 may be split into two or more separate components, such as a north bridge and a south bridge, for example. Also, in some instances, some or all of the functionality of the I/O interface 1008, such as an interface to the memory 1006, may be incorporated directly into the processor(s) 1004 and/or one or more other components of the vehicle system 1002.

The example vehicle system 1002 may include a network interface 1010 configured to establish a communication link (i.e., "network") between the vehicle system 1002 and one or more other devices. For example, the network interface 1010 may be configured to allow data to be exchanged between the vehicle system 1002 and another vehicle 1018 via a first network 1020, and/or between the vehicle system 1002 and a remote computing system 1022 via a second network 1024. For example, the network interface 1010 may enable wireless communication between another vehicle 1018 and/or the remote computing device 1022. In various implementations, the network interface 1010 may support communication via wireless general data networks, such as a Wi-Fi network, and/or telecommunications networks, such as, for example, cellular communication networks, satellite networks, and the like.

The example vehicle system 1002 may include sensor(s) 1012, for example, configured to localize the vehicle system 1002 in an environment, to detect one or more objects in the environment, to sense movement of the example vehicle system 1002 through its environment, sense environmental data (e.g., ambient temperature, pressure, and humidity), and/or sense conditions of an interior of the example vehicle system 1002 (e.g., passenger count, interior temperature, noise level). The sensor(s) 1012 may include, for example, one or more LIDAR sensors, one or more cameras (e.g., RGB-cameras, intensity (grayscale) cameras, infrared cameras, depth cameras, stereo cameras), one or more magnetometers, one or more radar sensors, one or more sonar sensors, one or more microphones for sensing sounds, one or more IMU sensors (e.g., including accelerometers and gyroscopes), one or more GPS sensors, one or more Geiger counter sensors, one or more wheel encoders, one or more drive system sensors, a speed sensor, and/or other sensors related to the operation of the example vehicle system 1002. In some instances, the sensor data discussed herein may be received at a first vehicle and transmitted to a second vehicle. In some instances, the image discussed herein may be received at a sensor of the sensor(s) 1012 and provided to the perception engine 1026.

The example vehicle system 1002 may include a perception engine 1026 (e.g., perception engine 116), an ML model 1028 (e.g., ML model 114), and a planner 1030 (e.g., planner 120).

The perception engine 1026 may include instructions stored on memory 1006 that, when executed by the processor(s) 1004, configure the processor(s) 1004 to receive sensor data from the sensor(s) 1012 as input, and output data representative of, for example, one or more of the pose (e.g., position and orientation) of an object in the environment surrounding the example vehicle system 1002, an object track associated with the object (e.g., a historic position, velocity, acceleration, and/or heading of the object over a period of time (e.g., 5 seconds)), and/or an object classification associated with the object (e.g., a pedestrian, a vehicle, a bicyclist, etc.). In some instances, perception engine 1026 may be configured to predict more than an object trajectory of one or more objects. For example, the perception engine 1026 may be configured to predict multiple object trajectories based on, for example, probabilistic determinations or multi-modal distributions of predicted positions, trajectories, and/or velocities associated with an object.

The perception engine 1026 may include instructions stored on memory 1006 that, when executed by the processor(s) 1004, configure the processor(s) 1004 to receive sensor data from the sensor(s) 1012 as input, such as an image; provide the sensor data to the ML model 1028; receive an ROI, an image segment, and/or a confidence score from the ML model 1028; and output an indication that the perception engine detects an object from the sensor data and may output one or more ROIs, instance segmentation(s), confidence score(s), classification(s), and/or other data related thereto. The ROI(s), the instance segmentation(s), the confidence score(s), classification(s), and/or other data related thereto may also be stored in the memory 1006.

The ML model 1028 may include instructions stored on memory 1006 that, when executed by the processor(s) 1004, configure the processor(s) 1004 to receive an image and determine, based at least in part on the image, to output ROI(s) and/or an instance segmentation(s) identifying a representation of an object in the image. The ML model 1028 may include a decision tree or any arrangement thereof, such as a random forest and/or boosted ensemble of decision trees; a directed acyclic graph (DAG) (e.g., where the nodes are organized as a Bayesian network); deep learning algorithm(s), such as an artificial neural network (ANN), deep belief network (DBN), deep stacking network (DSN), or recurrent neural network (RNN); etc. In some instances, the ML model 1028 may include an RNN having nodes through which feature values may be pushed to determine an output. For example, the ML model 1028 may include an input layer of nodes, one or more hidden layer of nodes, and an output layer of nodes. In some instances, the input layer of nodes may be configured to receive the image and/or a portion thereof and activate nodes of the one or more hidden layers. The output layer may be configured to receive stimuli from nodes of the one or more hidden layers and to output an ROI, image segment, and/or confidence score based on nodes of the output layer that are most activated and/or the output of an output node may correspond to an amount of activation of the output node. In some instances, an individual output node may correspond with a portion of the image.

The perception engine 1026 may transmit the ROI, the image segment, the confidence score, and/or other data related thereto to the planner 1030 along with any other additional information that the planner 1030 may use to generate a trajectory (e.g., object classifications, object tracks, vehicle pose). In some instances, the perception engine 1026 and/or the planner 1030 may additionally or alternatively transmit the ROI(s), the instance segmentation(s), the confidence score(s), classification(s), and/or other data related thereto via the network interface 1010 to the remote computing device 1022 via network 1024 and/or another vehicle 1018 via network 1020, based, at least in part, on confidence score(s) determined by the perception engine 1026.

In some instances, the perception engine 1026 and/or the ML model 1028 may be located at another vehicle 1018 and/or the remote computing device 1022. In some instances, a perception engine located at another vehicle 1018 and/or remote computing device 1022 may coordinate determinations with the perception engine 1026. In some instances where the ML model 1028 is located at the other vehicle 1018 and/or remote computing device 1022, the other vehicle 1018 and/or remote computing device 1022 may receive the image from the vehicle system 1002 via networks 1020 and 1024, respectively, and may determine the ROI(s), the instance segmentation(s), the confidence score(s), classification(s), and/or other data related thereto. The other vehicle 1018 and/or remote computing device 1022 may then transmit the ROI(s), the instance segmentation(s), the confidence score(s), classification(s), and/or other data related thereto back to a planner 1030 of the vehicle system 1002.

The planner 1030 may include instructions stored on memory 1006 that, when executed by the processor(s) 1004, configure the processor(s) 1004 to generate data representative of a trajectory of the example vehicle system 1002, for example, using data representing a location of the example vehicle system 1002 in its environment and other data, such as local pose data, and the ROI(s), the instance segmentation(s), the confidence score(s), classification(s), and/or other data related thereto. In some instances, the planner 1030 may substantially continuously (e.g., every 1 or 2 milliseconds, though any receding horizon time is contemplated) generate a plurality of potential trajectories with which to control the example vehicle system 1002 and select one of the trajectories with which to control the vehicle. The selection may be based at least in part on a current route, the probability that the stationary vehicle is a blocking vehicle, current vehicle trajectory, and/or detected object trajectory data. Upon selecting a trajectory, the planner 1030 may transmit the trajectory to the drive system 1016 to control the example vehicle system 1002 according to the selected trajectory.

In some instances, the perception engine 1026, the ML model 1028, and/or the planner 1030 may further include specialized hardware such as, for example, a processor that is suited to running the perception engine (e.g., a graphics processor, an FPGA).

Example Clauses

A. A system comprising: one or more processors; and one or more computer-readable media storing instructions executable by the one or more processors, wherein the instructions, when executed, cause the system to perform operations comprising: providing, as input to a machine learning (ML) model, an image; receiving, as output from the ML model, a feature map, wherein a portion of the feature map is associated with a bounding box and a confidence score; and training the ML model based at least in part on a subset of examples, the training comprising: identifying a reference region associated with an area of the image representing an object; selecting a first hard example for inclusion in the subset of examples, based at least in part on a first confidence score associated with a first bounding box, the first confidence score and the first bounding box associated with a first portion of the feature map; determining that a first degree of alignment of the first bounding box to the reference region meets or exceeds a threshold degree of alignment; and replacing, based at least in part on meeting or exceeding the threshold degree of alignment, the first hard example with a second hard example.

B. The system as paragraph A recites, the operations further comprising: including the second hard example in the subset of examples based at least in part on determining that a second degree of alignment of a second bounding box associated with the second hard example to the reference region is less than a threshold degree of alignment.

C. The system as paragraph A or B recites, wherein: a first portion of the reference region is indicated as being associated with a positive example; and the first portion of the feature map is associated with a second portion of the reference region outside the first portion of the reference region.

D. The system as paragraph C recites, wherein: a first target confidence score associated with the first portion of the reference region is a maximum confidence score; a second target confidence score associated with the second portion is a minimum confidence score; and training the ML model further comprises: associating the first hard example with the first target confidence score instead of the second target confidence score, based at least in part on the first degree of alignment meeting or exceeding the threshold degree of alignment.

E. The system as any of paragraphs A-D recites, wherein the first degree of alignment is an intersection of the first bounding box with the reference region divided by a union of the first bounding box and the area.

F. A computer-implemented method comprising: receiving an image representing an object; identifying a reference region indicative of an area representing the object in the image; selecting a subset of portions of the image; and training, based at least in part on the subset, a machine-learning (ML) model to output a feature map, a portion of the feature map associated with classification information, region of interest (ROI) information, and confidence information, wherein selecting the subset of portions of the image comprises: identifying a first portion of the feature map based at least in part on the first portion having first confidence information that meets or exceeds a threshold confidence; comparing, as a comparison, ROI information associated with the first portion with the reference region; and determining, as the subset of portions of the image and based at least in part on the comparison, a second portion of the feature map.

G. The computer-implemented method as paragraph F recites, wherein: comparing the ROI comprises performing a non-maximal suppression (NMS) of the ROI information of the first portion with respect to the reference region; and the second portion of the feature map is associated with an ROI suppressed under non-maximal suppression.

H. The computer-implemented method as paragraph G recites, further comprising: associating, with the first portion, a highest confidence score.

I. The computer-implemented method as any of paragraphs F-H recites, further comprising: training the ML model to substantially simultaneously output multiple output ROIs corresponding to classifications based at least in part on the image, the classifications comprising one or more of a vehicle, a pedestrian, or a bicyclist.

J. The computer-implemented method as any of paragraphs F-I recites, wherein: the reference region comprises a first region and a second region, and further wherein the second portion of the feature map comprises features outside of the first region.

K. The computer-implemented method as paragraph J recites, wherein the first region is associated with: a central portion of the reference region; and a positive identification of classification information.

L. The computer-implemented method as any of paragraphs F-K recites, wherein comparing comprises determining an amount of alignment as an intersection of the ROI information with the area indicated by the reference region divided by a union of the ROI information and the reference region.

M. The computer-implemented method as paragraph L recites, wherein comparing further comprises determining the amount of alignment meets or exceeds a threshold degree of alignment.

N. The computer-implemented method as any of paragraphs F-M recites, wherein training the ML model comprises at least two stages, wherein: a first stage of the at least two stages comprises: providing, as first input to the ML model, a first batch of images; receiving from the ML model and based at least in part on the first batch of images, an intermediate ROI associated with a first image of the first batch of images; identifying, as the reference region, the intermediate ROI; and a second stage of the at least two stages comprises: providing, as second input to the ML model, the first batch of images; receiving from the ML model and based at least in part on the first batch of images, a second plurality of ROIs and a second plurality of confidence scores associated therewith; selecting, for inclusion in a second subset of examples for training the ML model and based at least in part on a non-maximal suppression (NMS) technique, a hard example for training the ML model from among portions of the image associated with the second plurality of ROIs; and training the ML model based at least in part on the second subset.

O. The computer-implemented method as paragraph N recites, wherein the second stage further comprises training the ML model using focal loss.

P. The computer-implemented method as any of paragraphs F-O recites, wherein the ROI information comprises a bounding box.

Q. The computer-implemented method as any of paragraphs F-P recites, further comprising: receiving a batch of images comprising a first predefined number of images that are associated with a first object classification and a second predefined number of images that are associated with a second object classification; and training the ML model based at least in part on providing the batch of images as input to the ML model, wherein the first predefined number of images and the second predefined number of images are based at least in part on confidence information associated with one or more features of the feature map.

R. A non-transitory computer-readable medium having a set of instructions that, when executed, cause one or more processors to perform operations comprising: providing, as input to a machine-learning (ML) model, an image; receiving, as output from the ML model, a feature map, a first portion of the feature map comprising a first region of interest (ROI) indicative of an object in the image and a first confidence score; and training the ML model based at least in part on a subset of positive examples and a subset of negative examples associated with a plurality of portions of a test image, wherein training the ML model comprises: providing the test image to the ML model, the test image representing an object corresponding to a ground truth reference region; determining, as a hard negative example, a second portion of the feature map having a second confidence score that meets or exceeds a threshold confidence score; determining that the hard negative example is associated with a second ROI that is suppressed under a non-maximal suppression technique; and excluding, from the subset of negative examples, the hard negative example.

S. The non-transitory computer-readable medium as paragraph R recites, wherein: the first ROI of the first portion comprises a bounding box; and the first confidence score of the first portion indicates a probability that the first ROI accurately represents a region of the image that represents the object.

T. The non-transitory computer-readable medium as paragraph R or S recites, wherein the first portion of the feature map is associated with a plurality of ROIs, an ROI of the plurality of ROIs corresponding to a plurality of classifications, the classifications comprising one or more of a vehicle, a bicycle, or a pedestrian.

U. A system comprising: one or more processors; and one or more computer-readable media storing instructions executable by the one or more processors, wherein the instructions, when executed, cause the system to perform operations comprising: receiving an image having a first scale; providing the image to a first machine-learning (ML) model; receiving, from the first ML model, a first bounding box indicative of a first region of the image representing at least part of a first object, the first bounding box having a first size within a first range of sizes; scaling, based at least in part on a second scale, the image as a scaled image; providing the scaled image to a second ML model; and receiving, from the second ML model, a second bounding box indicative of a second region of the image representing at least part of a second object, the second bounding box having a second size within a second range of sizes.

V. The system as paragraph U recites, wherein the image is provided to the first ML model and the scaled image is provided to the second ML model substantially simultaneously.

W. The system as paragraph U or V recites, wherein the first ML model and the second ML model are a same ML model.

X. The system as any of paragraphs U-W recites, the operations further comprising: determining the first range of sizes for the ML model based at least in part on: providing, as input to the ML model, a first batch of training images that include objects of different sizes; determining, based at least in part on ground truths associated with the objects, accuracies of the ML model as a function of ROI sizes; and determining the first range of sizes based at least in part on identifying a range of ROI sizes that correspond to accuracies that meet or exceed a threshold accuracy.

Y. A computer-implemented method comprising: receiving a first scaled image and a second scaled image, the first scaled image and the second scaled image corresponding to an image; providing, as first input to a first machine-learning (ML) model, the first scaled image; receiving, as first output from the first ML model, one or more first regions of interest (ROIs) having sizes within a first range of sizes; providing, as second input to a second ML model, the second scaled image; and receiving, as second output from the second ML model, one or more second ROIs having sizes within a second range of sizes.

Z. The computer-implemented method as paragraph Y recites, wherein: the image includes representations of a first object and a second object, and the computer-implemented method further comprises: determining, by the first ML model and based at least in part on the first scaled image, a first ROI that represents the first object and a second ROI that represents the second object; and determining, by the second ML model and based at least in part on the second scaled image, a third ROI that represents the first object and a fourth ROI that represents the second object.

AA. The computer-implemented method as paragraph Z recites, wherein: the first ROI has a first size outside the first range of sizes; the second ROI has a second size within the first range of sizes; the third ROI has a third size outside the second range of sizes; the fourth ROI has a fourth size within the second range of sizes; the first ML model discards the first ROI and outputs the second ROI; and the second ML model discards the fourth ROI and outputs the third ROI.

AB. The computer-implemented method as any of paragraphs Y-AA recites, further comprising: scaling, based at least in part on a first scale, the image to generate the first scaled image; and scaling, based at least in part on a second scale, the image to generate the second scaled image.

AC. The computer-implemented method as any of paragraphs Y-AB recites, wherein the first scaled image is provided to the first ML model and the second scaled image is provided to the second ML model substantially simultaneously.

AD. The computer-implemented method as any of paragraphs Y-AC recites, further comprising determining the first range of sizes based at least in part on an accuracy associated with a first ROI of the one or more first ROIs, the determining comprising: determining, based at least in part on a ground truth associated with an area of the image representing an object, a degree of alignment of the first ROI to the area defined by the ground truth; and determining the first range of sizes based at least in part on identifying a range of ROI sizes that corresponds to degrees of alignment determined for the one or more first ROIs that meet or exceed a threshold degree of alignment.

AE. The computer-implemented method as any of paragraphs Y-AD recites, further comprising: receiving a batch of images, wherein the batch of images includes a first predefined number of images that are associated with a first object classification and a second predefined number of images that are associated with a second object classification; and training the first ML model based at least in part on providing the batch of images as input to the first ML model, wherein the first predefined number of images and the second predefined number of images as based at least in part on a confidence score associated with the first ML model or the second ML model.

AF. A non-transitory computer-readable medium having a set of instructions that, when executed, cause one or more processors to perform operations comprising: providing, as input to a first machine-learning (ML) model associated with a first size range, an image; determining, by the first ML model and based at least in part on the image, a first plurality of regions of interest (ROIs); suppressing a first output of a first subset of ROIs of the first plurality of ROIs, wherein suppressing the first output of the first subset of ROIs comprises determining that the first subset of ROIs is associated with first sizes that are outside the first size range; and receiving, as a second output from the first ML model, one or more first ROIs associated with an object or a first indication that a dimension of the object is outside the first size range.

AG. The non-transitory computer-readable medium as paragraph AF recites, wherein receiving the first indication that the dimension of the object is outside the first size range is based at least in part on determining that the first subset of ROIs includes all of the first plurality of ROIs.

AH. The non-transitory computer-readable medium as paragraph AF or AG recites, wherein the operations further comprise: providing, as input to a second ML model associated with a second size range, the image, wherein providing the image to the second ML model occurs substantially simultaneously as providing the image to the first ML model; determining, by the second ML model, a second plurality of ROIs; suppressing a third output of a second subset of ROIs of the second plurality of ROIs, wherein suppressing the second subset of ROIs comprises determining that at least a portion of ROIs of the second subset of ROIs is associated with second sizes that are outside the second size range; and receiving, from the second ML model, one or more second ROIs associated with the object or a second indication that the dimension of the object is outside the second size range.

AI. The non-transitory computer-readable medium as paragraph AH recites, wherein an ROI corresponding to the object is received from the first ML model or the second ML model, based at least in part on the dimension of the object in the image, the first size range, and the second size range.

AJ. The non-transitory computer-readable medium as paragraph AH or AI recites, wherein: the first ML model outputs the one or more first ROIs having sizes within the first size range, based at least in part on a first accuracy of the first ML model associated with the first size range; and the second ML model outputs the one or more second ROIs having sizes within the second size range, based at least in part on a second accuracy of the second ML model associated with the second size range.

AK. The non-transitory computer-readable medium as any of paragraphs AH-AJ recites, wherein the operations further comprise: generating, based at least in part on the one or more first ROIs or the one or more second ROIs, a trajectory for controlling motion of an autonomous vehicle.

AL. The non-transitory computer-readable medium as any of paragraphs AH-AK recites, wherein the operations further comprise: selecting the first size range and the second size range based at least in part on a machine learned model.

AM. The non-transitory computer-readable medium as any of paragraphs AF-AL recites, wherein the operations further comprise determining the first size range for the first ML model based at least in part on: training the first ML model, wherein the training comprises: providing, as input to the first ML model, test images that include test objects associated with areas defined by reference regions; and determining, by the first ML model and based at least in part on the test images, multiple ROIs; determining degrees of alignment of the multiple ROIs to an area of the areas defined by the reference regions; and determining the first size range based at least in part on identifying a span of object sizes that corresponds to a portion of the degrees of alignment that meet or exceed a threshold degree of alignment.

AN. The non-transitory computer-readable medium as any of paragraphs AF-AM recites, wherein the operations further comprise: receiving a batch of images, wherein the batch of images comprises a first predefined number of images that are associated with a first object classification and a second predefined number of images that are associated with a second object classification; and training the first ML model based at least in part on providing the batch of images as input to the first ML model, wherein the first predefined number and the second predefined number are based at least in part on a confidence score associated with the first ML model or a second ML model.

AO. A computer-implemented method comprising: providing, as input to a machine-learning (ML) model, an image; receiving, as output from the ML model, a feature map comprising a plurality of features, a feature of the plurality of features comprising a confidence score, classification information, and a region of interest (ROI) determined in accordance with a non-maximal suppression (NMS) technique; and associating, using an instance segmentation, a subset of features having similar ROIs.

AP. The computer-implemented method as paragraph AO recites, wherein the subset of features having the similar ROIs comprises features which are indicated as being suppressed via the NMS technique.

AQ. The computer-implemented method as paragraph AP recites, wherein determining to output a first ROI associated with a first feature comprises: determining that the first ROI is associated with a maximum confidence score of a subset of confidence scores associated with the subset of features; and outputting the first ROI to associate a region of the image as representing an object.

AR. The computer-implemented method as any of paragraphs AO-AQ recites, further comprising outputting a mask corresponding to the instance segmentation to identify pixels of the image as representing an object.

AS. The computer-implemented method as paragraph AR recites, further comprising generating, based at least in part on at least one of an ROI output by the ML model or the instance segmentation, a trajectory for controlling motion of an autonomous vehicle.

AT. The computer-implemented method as any of paragraphs AO-AS recites, further comprising training the ML model based at least in part on a test image and a ground truth associated therewith, wherein the ground truth identifies a mask.

AU. The computer-implemented method as any of paragraphs AO-AT recites, further comprising training the ML model to substantially simultaneously output multiple ROIs for each feature corresponding to multiple classifications, the multiple classifications comprising one or more of a vehicle, a pedestrian, or a bicycle.

AV. The computer-implemented method as any of paragraphs AO-AU recites, wherein the ROI is a bounding box.

AW. A system comprising: one or more processors; and one or more computer-readable media storing instructions executable by the one or more processors, wherein the instructions, when executed, cause the system to perform operations comprising: providing, as input to a machine-learning (ML) model, an image; determining, by the ML, a feature map comprising a plurality of features, a feature of the plurality of features comprising a region of interest (ROI), an identification, and a confidence score; and outputting, as an instance segmentation, an output image based at least in part on identifications associated with the plurality of features.

AX. The system as paragraph AW recites, wherein the ROI of the feature is determined in accordance with a non-maximal suppression (NMS) technique, the NMS technique comprising: determining that the confidence score associated with the feature meets or exceeds a threshold confidence score; determining that the ROI is associated with a degree of alignment to a corresponding ROI of a corresponding feature that meets or exceeds a threshold degree of alignment; determining, as the ROI, the corresponding ROI; and determining, as the identification, a corresponding identification of the corresponding feature.

AY. The system as paragraph AW or AX recites, wherein the operations further comprise outputting the instance segmentation as a mask that identifies pixels of the image as representing an object associated with an object classification.

AZ. The system as paragraph AY recited, the operations further comprising: determining, based at least in part on the mask, a trajectory configured to cause an autonomous vehicle to traverse a portion of an environment; and providing the trajectory to the autonomous vehicle.

BA. The system as any of paragraphs AW-AZ recites, the operations further comprising: training the ML model based at least in part on providing, as input to the ML model and substantially simultaneously, a batch of images that includes a first predefined number of images that are associated with a first object classification and a second predefined number of images that are associated with a second object classification, wherein the first predefined number and the second predefined number are determined based at least in part on one or more confidence scores associated with the plurality of features.

BB. The system as any of paragraphs AW-BA recites, the operations further comprising: training the ML model based at least in part on a test image and a ground truth associated therewith, wherein the ground truth identifies a reference region and a mask.

BC. A non-transitory computer-readable medium having a set of instructions that, when executed, cause one or more processors to perform operations comprising: receiving, at a machine-learning (ML) model, an image; determining, by the ML model, a feature map comprising a plurality of features, a feature of the plurality of features comprising a region of interest (ROI) and an identification, the ROI indicative of one or more objects in the image; and outputting, as an instance segmentation, identifications associated with the plurality of features, wherein an identification of the identifications is determined, based at least in part, on the ROI of the feature and a non-maximal suppression (NMS) technique.

BD. The non-transitory computer-readable medium as paragraph BC recites, wherein the identification is further determined based on whether the ROI of the feature is suppressed under the NMS technique based on a corresponding ROI of a corresponding feature, the feature and the corresponding feature having the same identification.

BE. The non-transitory computer-readable medium as paragraph BC or BD recites, wherein the ROI is a bounding box having an extent and a center position.

BF. The non-transitory computer-readable medium as any of paragraphs BC-BE recites, wherein the feature map has dimensions that are a fraction of dimensions of the image.

BG. The non-transitory computer-readable medium as any of paragraphs BC-BF recites, the operations further comprising: training the ML model based at least in part on a test image and a ground truth associated therewith, wherein the ground truth identifies a reference region and a mask.

BH. The non-transitory computer-readable medium as paragraph BG recites, wherein the training the ML model comprises providing, as input to the ML model, a batch of images that comprises a first predefined number of images that are associated with a first object classification and a second predefined number of images that are associated with a second object classification, wherein the first predefined number and the second predefined number are based at least in part on one more confidence levels of the plurality of features.

While the example clauses described above are described with respect to one particular implementation, it should be understood that, in the context of this document, the content of the example clauses can also be implemented via a method, device, system, a computer-readable medium, and/ or another implementation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously, in reverse order, with additional operations, or omitting operations, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing instructions executable by the one or more processors, wherein the instructions, when executed, cause the system to perform operations comprising:
receiving an image having a first scale;
providing the image to a first machine-learning (ML) model trained to output regions of interest (ROIs) having sizes within a first range of sizes,
wherein the first ML model is trained to output the ROIs having the sizes within the first range of sizes based at least in part on:
training the first ML model, wherein the training comprises:
providing, as input to the first ML model, test images that include test objects associated with areas defined by reference regions; and
determining, by the first ML model and based at least in part on the test images, multiple ROIs;
determining degrees of alignment of the multiple ROIs to an area of the areas defined by the reference regions; and
determining the first range of sizes based at least in part on identifying a span of object sizes that corresponds to a portion of the degrees of alignment that meet or exceed a threshold degree of alignment;

receiving, from the first ML model, a first ROI indicative of a first region of the image representing at least part of a first object, the first ROI having a first size within the first range of sizes;

scaling, based at least in part on a second scale, the image as a scaled image, the scaled image and the image being different sizes;

providing the scaled image to a second ML model trained to output ROIs having sizes within a second range of sizes, wherein the first range of sizes and the second range of sizes are different from each other; and receiving, from the second ML model, a second ROI indicative of a second region of the image representing at least part of a second object, the second ROI having a second size within the second range of sizes.

2. The system as claim 1 recites, wherein the image is provided to the first ML model and the scaled image is provided to the second ML model substantially simultaneously.

3. The system as claim 1 recites, wherein the first ML model and the second ML model are a same ML model.

4. The system as claim 1 recites, the operations further comprising:

determining the first range of sizes for the first ML model based at least in part on:
  providing, as input to the first ML model, a first batch of training images that include objects of different sizes;
  determining, based at least in part on ground truths associated with the objects, accuracies of the first ML model as a function of ROI sizes; and
  determining the first range of sizes based at least in part on identifying a range of ROI sizes that correspond to accuracies that meet or exceed a threshold accuracy.

5. A computer-implemented method comprising:

receiving a first scaled image and a second scaled image, the first scaled image and the second scaled image being two differently sized versions of a same image;

providing, as first input to a first machine-learning (ML) model trained to output regions of interest (ROIs) having sizes within a first range of sizes, the first scaled image, wherein the first ML model is trained to output the ROIs having the sizes within the first range of sizes based at least in part on:
  training the first ML model, wherein the training comprises:
    providing, as input to the first ML model, test images that include test objects associated with areas defined by reference regions; and
    determining, by the first ML model and based at least in part on the test images, multiple ROIs;
  determining degrees of alignment of the multiple ROIs to an area of the areas defined by the reference regions; and
  determining the first range of sizes based at least in part on identifying a span of object sizes that corresponds to a portion of the degrees of alignment that meet or exceed a threshold degree of alignment;

receiving, as first output from the first ML model, one or more first ROIs having sizes within the first range of sizes;

providing, as second input to a second ML model trained to output ROIs having sizes within a second range of sizes, wherein the first range of sizes and the second range of sizes are different from each other, the second scaled image; and receiving, as second output from the second ML model, one or more second ROIs having sizes within the second range of sizes.

6. The computer-implemented method as claim 5 recites, wherein:

the image includes representations of a first object and a second object, and the computer-implemented method further comprises:
  determining, by the first ML model and based at least in part on the first scaled image, a first ROI that represents the first object and a second ROI that represents the second object; and
  determining, by the second ML model and based at least in part on the second scaled image, a third ROI that represents the first object and a fourth ROI that represents the second object.

7. The computer-implemented method as claim 6 recites, wherein:

the first ROI has a first size outside the first range of sizes;
the second ROI has a second size within the first range of sizes;
the third ROI has a third size outside the second range of sizes;
the fourth ROI has a fourth size within the second range of sizes;
the first ML model discards the first ROI and outputs the second ROI; and
the second ML model discards the fourth ROI and outputs the third ROI.

8. The computer-implemented method as claim 5 recites, further comprising:

scaling, based at least in part on a first scale, the image to generate the first scaled image; and
scaling, based at least in part on a second scale, the image to generate the second scaled image.

9. The computer-implemented method as claim 5 recites, wherein the first scaled image is provided to the first ML model and the second scaled image is provided to the second ML model substantially simultaneously.

10. The computer-implemented method as claim 5 recites, further comprising determining the first range of sizes based at least in part on an accuracy associated with a first ROI of the one or more first ROIs, the determining comprising:

determining, based at least in part on a ground truth associated with an area of the image representing an object, a degree of alignment of the first ROI to the area defined by the ground truth; and determining the first range of sizes based at least in part on identifying a range of ROI sizes that corresponds to degrees of alignment determined for the one or more first ROIs that meet or exceed a threshold degree of alignment.

11. The computer-implemented method as claim 5 recites, further comprising:

receiving a batch of images, wherein the batch of images includes a first predefined number of images that are associated with a first object classification and a second predefined number of images that are associated with a second object classification; and training the first ML model based at least in part on providing the batch of images as input to the first ML model, wherein the first predefined number of images and the second predefined number of images as based at least in part on a confidence score associated with the first ML model or the second ML model.

12. A non-transitory computer-readable medium having a set of instructions that, when executed, cause one or more processors to perform operations comprising:
receiving a first scaled image and a second scaled image, the first scaled image and the second scaled image corresponding to an image;
providing, as first input to a first machine-learning (ML) model trained to output regions of interest (ROIs) having sizes within a first range of sizes, the first scaled image,
wherein the first ML model is trained to output the ROIs having the sizes within the first range of sizes based at least in part on:
training the first ML model, wherein the training comprises:
providing, as input to the first ML model, test images that include test objects associated with areas defined by reference regions; and
determining, by the first ML model and based at least in part on the test images, multiple ROIs;
determining degrees of alignment of the multiple ROIs to an area of the areas defined by the reference regions; and
determining the first range of sizes based at least in part on identifying a span of object sizes that corresponds to a portion of the degrees of alignment that meet or exceed a threshold degree of alignment;
receiving, as first output from the first ML model, one or more first ROIs having sizes within the first range of sizes;
providing, as second input to a second ML model trained to output ROIs having sizes within a second range of sizes, wherein the first range of sizes and the second range of sizes are different from each other, the second scaled image; and
receiving, as second output from the second ML model, one or more second ROIs having sizes within the second range of sizes.

13. The non-transitory computer-readable medium as claim 12 recites, wherein:
the image includes representations of a first object and a second object, and
the operations further comprise:
determining, by the first ML model and based at least in part on the first scaled image, a first ROI that represents the first object and a second ROI that represents the second object; and
determining, by the second ML model and based at least in part on the second scaled image, a third ROI that represents the first object and a fourth ROI that represents the second object.

14. The non-transitory computer-readable medium as claim 13 recites, wherein:
the first ROI has a first size outside the first range of sizes;
the second ROI has a second size within the first range of sizes;
the third ROI has a third size outside the second range of sizes;
the fourth ROI has a fourth size within the second range of sizes;
the first ML model discards the first ROI and outputs the second ROI; and
the second ML model discards the fourth ROI and outputs the third ROI.

15. The non-transitory computer-readable medium as claim 12 recites, wherein the operations further comprise:
scaling, based at least in part on a first scale, the image to generate the first scaled image; and
scaling, based at least in part on a second scale, the image to generate the second scaled image.

16. The non-transitory computer-readable medium as claim 12 recites, wherein the first scaled image is provided to the first ML model and the second scaled image is provided to the second ML model substantially simultaneously.

17. The non-transitory computer-readable medium as claim 12 recites, wherein the operations further comprise determining the first range of sizes based at least in part on an accuracy associated with a first ROI of the one or more first ROIs, the determining comprising:
determining, based at least in part on a ground truth associated with an area of the image representing an object, a degree of alignment of the first ROI to the area defined by the ground truth; and
determining the first range of sizes based at least in part on identifying a range of ROI sizes that corresponds to degrees of alignment determined for the one or more first ROIs that meet or exceed a threshold degree of alignment.

18. The non-transitory computer-readable medium as claim 12 recites, wherein the operations further comprise:
receiving a batch of images, wherein the batch of images includes a first predefined number of images that are associated with a first object classification and a second predefined number of images that are associated with a second object classification; and
training the first ML model based at least in part on providing the batch of images as input to the first ML model,
wherein the first predefined number of images and the second predefined number of images as based at least in part on a confidence score associated with the first ML model or the second ML model.

19. The non-transitory computer-readable medium as claim 12 recites, wherein the operations further comprising determining to associate an ROI with a representation of an object in the image, wherein determining to associate the ROI with the representation is based at least in part on determining to use the first ROIs or the second ROIs based at least in part on a dimension of the representation in the image, the first range of sizes, and the second range of sizes.

* * * * *